(12) United States Patent
Pettersson et al.

(10) Patent No.: US 12,544,142 B2
(45) Date of Patent: Feb. 10, 2026

(54) METHOD AND SYSTEM FOR ASSOCIATING PRE-OPERATIVE PLAN WITH POSITION DATA OF SURGICAL INSTRUMENT

(71) Applicant: Ortoma AB, Gothenburg (SE)

(72) Inventors: Andreas Pettersson, Mölnlycke (SE); Pasi Riihinen, Mölndal (SE)

(73) Assignee: Ortoma AB, Gothenburg (SE)

( * ) Notice: Subject to any disclaimer, the term of this patent is extended or adjusted under 35 U.S.C. 154(b) by 509 days.

(21) Appl. No.: 16/301,436

(22) PCT Filed: Nov. 14, 2016

(86) PCT No.: PCT/SE2016/051120
§ 371 (c)(1),
(2) Date: Nov. 13, 2018

(87) PCT Pub. No.: WO2017/200446
PCT Pub. Date: Nov. 23, 2017

(65) Prior Publication Data
US 2019/0290366 A1    Sep. 26, 2019

(30) Foreign Application Priority Data

May 15, 2016    (SE) .................................. 1650650-3

(51) Int. Cl.
*A61B 34/20*    (2016.01)
*A61B 17/00*    (2006.01)
(Continued)

(52) U.S. Cl.
CPC .......... *A61B 34/20* (2016.02); *A61B 17/1659* (2013.01); *A61B 34/10* (2016.02);
(Continued)

(58) Field of Classification Search
CPC ......... A61B 34/20; A61B 90/39; A61B 5/055; A61B 2034/107; A61B 2034/2051;
(Continued)

(56) References Cited

U.S. PATENT DOCUMENTS 7,567,693 B2 *   7/2009   deCharms .............. A61B 5/055
                                                    382/128
8,565,860 B2 *  10/2013   Kimchy ................. A61B 5/064
                                                    250/363.01
(Continued)

FOREIGN PATENT DOCUMENTS

EP          1095628 A2     5/2001
EP          1571581 A1     9/2005
(Continued)

OTHER PUBLICATIONS

Maravilla, K. R., & Murry Jr, R. C. (1981). Computed tomography: basic principles of operation. Neurosurgery, 28, 482-501. (Year: 1981).*

(Continued)

*Primary Examiner* — Keith M Raymond
*Assistant Examiner* — Johnathan Maynard
(74) *Attorney, Agent, or Firm* — Downs Rachlin Martin PLLC

(57) ABSTRACT

An association of a pre-operative plan and tracked position and orientation of a surgical instrument relative patient anatomy in a navigation system is generated. The pre-operative plan includes a virtual representation of the patient anatomy data. Position and orientation of the patient anatomy as well as position and orientation of the surgical instrument within the navigation system is obtained. A virtual representation of the surgical instrument relative the virtual representation of the patient anatomy data is generated in multiple orientations in separate parts of a split (Continued)

window. A system with a tracker comprising a tracker interface for attaching the tracker to the instrument includes a surgical navigation module for generating the virtual representation in a split window.

25 Claims, 11 Drawing Sheets

(51) Int. Cl.
- A61B 17/16 (2006.01)
- A61B 34/00 (2016.01)
- A61B 34/10 (2016.01)
- A61B 90/00 (2016.01)
- A61B 90/98 (2016.01)
- G16H 40/63 (2018.01)

(52) U.S. Cl.
CPC ............. *A61B 34/25* (2016.02); *A61B 90/08* (2016.02); *A61B 90/98* (2016.02); *G16H 40/63* (2018.01); A61B 2017/00477 (2013.01); A61B 2017/00725 (2013.01); A61B 2034/104 (2016.02); A61B 2034/105 (2016.02); A61B 2034/107 (2016.02); A61B 2034/2048 (2016.02); A61B 2034/2051 (2016.02); A61B 2034/2055 (2016.02); A61B 2034/2072 (2016.02); A61B 2090/0811 (2016.02); A61B 2090/3983 (2016.02); A61B 2560/0223 (2013.01)

(58) Field of Classification Search
CPC .............. A61B 34/10; A61B 2034/102; A61B 2034/105; A61B 2034/2055; A61B 2034/2065; A61B 2034/2068; A61B 2034/2072; A61B 2034/252; A61B 2034/254; A61B 2034/256; A61B 2090/363; A61B 2090/365; A61B 5/0042; A61B 5/064; A61B 6/032; A61B 6/037; A61B 17/00491; A61B 17/0642; A61B 17/34; A61B 17/86; A61B 2017/00199; A61B 2034/104; A61B 2034/108; A61B 2034/2057; A61B 2090/103; A61B 2090/368; A61B 2090/3735; A61B 34/00; A61B 34/25; A61B 34/30; A61B 5/0035; A61B 5/0037; A61B 5/0066; A61B 5/062; A61B 5/1072; A61B 5/1079; A61B 5/743; A61B 6/03; A61B 6/12; A61B 6/463; A61B 6/501; A61B 6/505; A61B 6/5229; A61B 6/5247; A61B 8/0841; A61B 90/50; A61F 2/28; A61F 2/2875; A61F 2/30942; A61F 2/46; A61F 2/4601; A61F 2002/2835; A61F 2002/30948; A61F 2002/4632; G16H 20/40; G16H 30/20; G16H 30/40; G16H 40/63; G16H 50/50

See application file for complete search history.

(56) References Cited

U.S. PATENT DOCUMENTS

| | | | |
|---|---|---|---|
| 8,585,598 B2 * | 11/2013 | Razzaque | A61B 90/37 600/439 |
| 8,641,621 B2 * | 2/2014 | Razzaque | A61B 18/1477 600/407 |
| 9,675,319 B1 * | 6/2017 | Razzaque | A61B 6/037 |
| 2001/0044578 A1 | 11/2001 | Ben-Haim et al. | |
| 2004/0171924 A1 * | 9/2004 | Mire | A61B 34/20 600/407 |
| 2005/0059873 A1 | 3/2005 | Glozman et al. | |
| 2005/0245817 A1 | 11/2005 | Clayton et al. | |
| 2006/0142657 A1 | 6/2006 | Quaid et al. | |
| 2006/0241416 A1 | 10/2006 | Marquart et al. | |
| 2007/0175489 A1 * | 8/2007 | Moctezuma De La Barrera | A61B 34/20 606/1 |
| 2007/0211927 A1 * | 9/2007 | Groszmann | A61B 5/062 382/128 |
| 2009/0287467 A1 * | 11/2009 | Sparks | A61B 34/10 607/116 |
| 2011/0040175 A1 | 2/2011 | Shahidi | |
| 2012/0256920 A1 * | 10/2012 | Marshall | A61B 6/0414 345/420 |
| 2013/0197357 A1 * | 8/2013 | Green | A61B 90/361 600/424 |
| 2013/0211531 A1 * | 8/2013 | Steines | A61F 2/3859 623/20.14 |
| 2014/0022283 A1 | 1/2014 | Chan et al. | |
| 2015/0265362 A1 * | 9/2015 | Andersson | G06F 3/04842 703/11 |
| 2015/0366525 A1 * | 12/2015 | Sandholm | A61B 6/4085 378/4 |
| 2016/0070436 A1 * | 3/2016 | Thomas | G06T 7/0012 715/771 |
| 2016/0242724 A1 * | 8/2016 | Lavallee | A61B 90/39 |
| 2016/0324598 A1 * | 11/2016 | Bothorel | A61B 6/51 |
| 2017/0231771 A1 * | 8/2017 | Piron | A61B 8/0841 606/102 |
| 2017/0258420 A1 * | 9/2017 | Inglese | G16H 50/30 |
| 2017/0265947 A1 * | 9/2017 | Dyer | A61B 6/501 |

FOREIGN PATENT DOCUMENTS

| | | |
|---|---|---|
| EP | 2666433 A1 | 11/2013 |
| WO | 2004070581 A2 | 8/2004 |

OTHER PUBLICATIONS

Claussen, C., Lochner, B., Claussen, C., & Lochner, B. (2004). Basic Physical Principles and Technical Considerations. Dynamic Computed Tomography: Basic Principles and Clinical Applications, 3-12. (Year: 2004).*

Hounsfield, G. N. (1980). Computed Medical Imaging. Science, 210(4465), 22-28. http://www.jstor.org/stable/1684581 (Year: 1980).*

Written Opinion dated Mar. 14, 2017, in connection with PCT/SE2016/051120, filed Nov. 14, 2016.

International Search Report dated Mar. 14, 2017, in connection with PCT/SE2016/051120, filed Nov. 14, 2016.

Kim C.W. et al.: "Use of navigation-assisted fluoroscopy to decrease radiation exposure during minimally invasive spine surgery", The Spine Journal, Jul. 2008, vol. 8, No. 4, p. 584-590.

Cevidanes L.H.C. et al: "Three-dimensional surgical simulation", American Journal of Orthodontics and Dentofacial Orthopedics, Sep. 2010, vol. 138, No. 3, p. 361-371.

European Search Report dated Nov. 29, 2019, in connection with EP16902561.

Vercruyssen et al., Depth and lateral deviations in guided implant surgery: an RCT comparing guided surgery with mental navigation or the use of a pilot-drill template; Clinical Oral Implants Research; 00, Jul. 7, 2014, 1-6; doi: 10.1111/clr.12460.

Gillot et al.; Accuracy of virtually planned and conventionally placed implants in edentulous cadaver maxillae and mandibles: a preliminary report; The Journal of Prosthetic Dentistry; vol. 112, Issue 4, Oct. 2014; pp. 798-804.

* cited by examiner

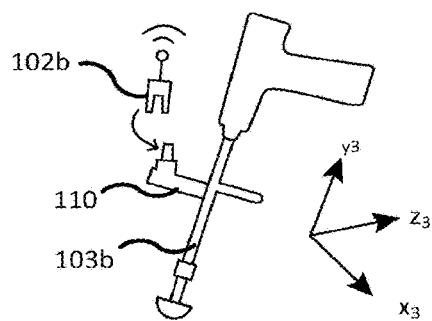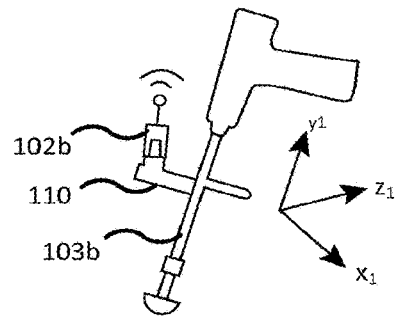
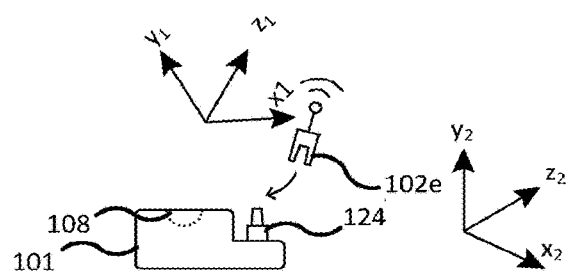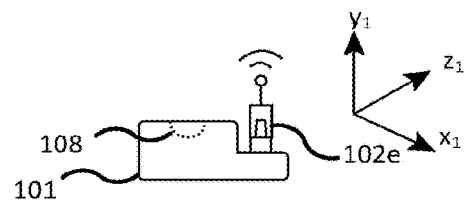
Fig. 6a
Fig. 6b
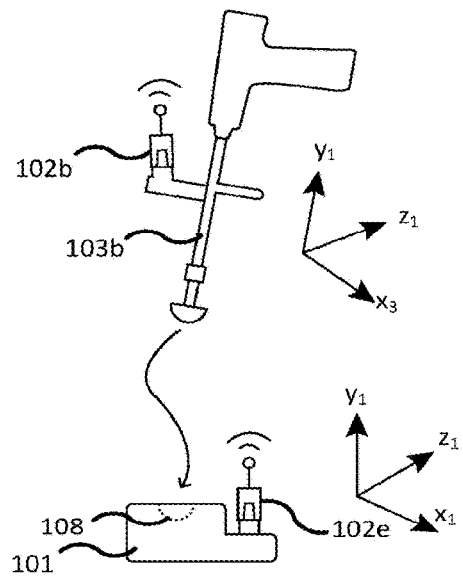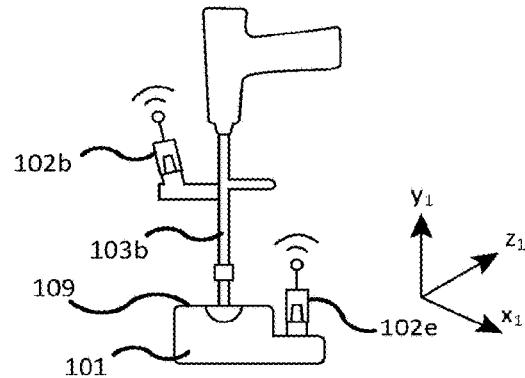
Fig. 6c
Fig. 6d

METHOD AND SYSTEM FOR ASSOCIATING PRE-OPERATIVE PLAN WITH POSITION DATA OF SURGICAL INSTRUMENT

FIELD OF THE INVENTION

This invention pertains in general to the field of surgical navigation systems. More particularly, the invention relates to a method and a system in a surgical navigation system, according to which virtual representations of a pre-operative plan is generated relative a virtual representation of a surgical instrument in multiple parts of a split window depending on tracked position and orientation of the surgical instrument.

BACKGROUND OF THE INVENTION

Orthopedic replacement systems, such as hip, knee, foot and ankle, shoulder, elbow, and spine replacement systems are commonly available. These systems comprise implants including various components for total replacements of a piece of the patient's anatomy. Each system comprises a range of components, including various sizes. For example, a hip replacement system can comprise an acetabular component, which includes an acetabular shell, and acetabular insert, and a bearing, and the femoral component, which includes the femoral stem. The systems can be cemented or press-fit. Furthermore, a wide variety of system specific instruments are used with each replacement system. Again taking a hip replacement system as an example, such as system may include instruments including osteotomes, reamers, saws, handles, planars, reamers, stem inserters, stem impactors, head impactors, chisels, broach handles, and trial components. Many times, the instruments are combined in kits, which include the required instrumentation for a particular replacement system. The instruments are to a large extent for multiple use.

Different replacement systems may be available on different markets. On each market, a number of competitive replacement systems are often available. On top of this, different replacement systems are available for the various surgical fields exemplified above. In summary, that means that there are a large number of replacement systems, and an even larger number of implant components and instruments, available on the global market. Providing a generic navigation system that is applicable to all of these replacement systems is challenging.

Surgeons generally select to work with a few replacement systems for a particular surgical intervention, such that a replacement surgery suitable to the individual patient can be provided. This means that the surgeon can have the required instruments available, and have a limited number of implant components in stock to be able to select amongst a few suitable implant components during surgery. Since the surgeon only works with a limited number of replacement systems, the surgeon can master these replacement systems in order to perform a surgery at the best of his/her ability. Yet, there are a large number of surgical interventions where the implant components are positioned in non-optimal positions, with non-optimal surgical outcome for the patient. Hence, there is a need for improvement of the positioning of implant components for orthopedic replacement systems. However, the surgeon do not want to work with different surgical navigation systems that are each specific for a single replacement system. Instead, the flexibility to select the most appropriate navigation system is desired and at the same time use the replacement system with which the surgeon is familiar.

Various Computer Assisted Orthopedic Systems (CAOS) exist, which range from active robotic to passive or navigation systems. Active robotic systems are capable of performing surgery autonomously without interaction by the surgeon. Semi-automatic robotic systems also exist, which give the surgeon more freedom, but still within certain limitations. Many times, the surgeon wants to be in control of the surgery. In such situations, passive or semi-automatic navigation systems are preferred, which provide additional information during a procedure compared to conventional surgery but do not perform the surgical action. The surgeon controls the intervention but acts on additional patient information obtained from a pre-operative scan. During surgery with a robotic system, the surgical instrument is not in the hands of the surgeon but carried by a robot, which is only indirectly controlled by the surgeon.

Surgical navigation systems use can comprise three major components to track instruments: the surgical aspect, the virtual aspect, and the navigator. The surgical aspect is the bones and accompanying tissues in the surgical field, i.e. the patient anatomy. The virtual aspect is the virtual representation of the surgical aspect, i.e. a virtual representation of the anatomy. Finally, the navigator establishes a coordinate system in which the location and orientation of the target as well as "end-effectors" are expressed. The "end-effectors" can be surgical instruments or active devices used during surgery.

The surgical navigation systems link a pre-operative plan with a planned position of a surgical object, such as an implant or instrument, relative patient data to an actual position of the surgical object relative patient anatomy. Making use of the data available in the pre-operative plan relative the tracked data is challenging since the virtual world inherently is two-dimensional whereas the surgeon is operating in the three-dimensional space. At the same time, the surgeon cannot see beyond surfaces in the real world whereas all patient data, i.e. also non-visible structures, is available in the virtual world. The system need to be configured how to provide the virtual data depending on actions in the real world.

Existing systems display a virtual object representation of patient anatomy and a virtual objet representation of the surgical instrument in a single part of a single window. Deviations between the actual position and orientation of the surgical instrument and planned position and orientation of the surgical instrument are presented as numeric values. Such a system is not intuitive to the surgeon, who has to translate numerical values to movements in the real world to compensate for the deviation. Hence, there is a need for a system that associates the pre-operative plan with tracked position and orientation data in an enhanced way. Furthermore, these systems are specific for a specific replacement system, with precise representations of the surgical instruments. For example, a reamer can be disclosed relative the virtual representation of the patient anatomy. As bone is harvested in the real world, bone is harvested in the virtual representation of the patient anatomy. This requires precise representation of the surface of the reamer in the virtual world. Hence, the feedback will be specific to a particular replacement system. The precise virtual representation of the exterior surface of each surgical instrument has to be provided. This makes the system complex to implement for different replacement systems. Also, since the display has limited space, how to generate different types of data in a limited space is challenging.

Hence, an improved surgical navigation method and system and associated attachments would be advantageous, and in particular allowing for improved guidance, precision, increased flexibility, cost-effectiveness, calibration and/or patient safety for use together with any orthopedic replacement system and surgical instruments of arbitrary shape available on the market would be advantageous.

SUMMARY OF THE INVENTION

Accordingly, embodiments preferably seek to mitigate, alleviate or eliminate one or more deficiencies, disadvantages or issues in the art, such as the above-identified, singly or in any combination by providing the method and system according to the appended patent claims.

Embodiments comprise a method for associating a pre-operative plan with position and orientation of a surgical instrument in a surgical navigation system. The method comprises providing a pre-operative plan including patient anatomy data; obtaining position and orientation of a patient anatomy within the navigation system; referencing the patient anatomy to a virtual representation of the patient anatomy data in the preoperative plan; obtaining tracking data containing information of position and orientation of a surgical instrument within the navigation system; and generating in separate parts of a split window multiple virtual representations of the surgical instrument relative multiple virtual representations of the pre-operative plan depending on the tracking data.

At least one display plane for generating the virtual representation of the patient anatomy data may be fixed relative at least one dimension of the virtual representation of the surgical instrument or the pre-operative plan. Generating in separate parts of a split window may comprise continuously updating at least one of said virtual representations of the pre-operative plan depending on the tracking data.

A plurality of orthogonally arranged display planes may be fixed relative at least one dimension of the virtual representation of the surgical instrument or the pre-operative plan. Generating in separate parts may comprise generating the multiple virtual representations of the surgical instrument relative said plurality of orthogonally arranged display planes and continuously update the virtual representations of the pre-operative plan in at least one part of said split window depending on the tracking data.

The method may comprise obtaining the position and orientation of the at least one display plane based on at least one of a planned position and a planned orientation of an implant component relative the patient anatomy data of the pre-operative plan.

The method may comprise generating at least one 3D representation as the virtual representation of the pre-operative plan in a first part of the split window. At least one 2D representation may be generated as the virtual representation of the pre-operative plan in a second part of the split window. Each of the 3D representation and the 2D representation may be generated dependent on the tracking data. The method may comprise generating grey value data from the patient anatomy data of the pre-operative plan in at least one of the separate parts of the split window depending on the tracking data. The method may comprise continuously generating at least two of grey value data, volumetric data, and object data based on the patient anatomy data of the pre-operative plan and in at least one of said separate parts of said split window depending on said tracking data.

The method may comprise generating the virtual representations of the surgical instrument relative the virtual representations of the pre-operative plan in at least three orientations in three different parts of the split window simultaneously and depending on the tracking data.

The method may comprise obtaining orientation settings for at least one part of the split window from the pre-operative plan, wherein the orientation setting defines the orientation of at least one virtual representation of the pre-operative plan in at least one part of the split window. It may be defined dependent on the particular attachment component(s) being used.

An axial or transverse representation of the pre-operative plan may be generated in a first part of the split window and at least one of a coronal representation and a sagittal representation of the pre-operative plan may be generated in at least a second part of the split window and depending on the tracking data.

An object representation of the patient anatomy data and the virtual representation of the surgical instrument may be generated in a first part of the split window depending on the tracking data, and a volumetric or grey value representation of the patient anatomy data and the virtual representation of the surgical instrument may be generated in a second part of the split window depending on the tracking data.

The method may comprise generating the object representation as well as a volumetric or grey value representation of the patient anatomy data and the virtual representation of the surgical instrument in the first part of the split window depending on the tracking data. The object representation and the volumetric representation may be at least partially offset in an axial direction of the virtual representation of the patient anatomy data.

The method may comprise receiving identity data from at least one tracker of the navigation system. The tracker identity data may be unique for each tracker in the navigation system. Position and orientation data of a tracker interface being attached to a tracker interface of an attachment component may be received. Calibration data defining the position and orientation of a portion of the surgical instrument relative a tracker interface of the attachment component may be obtained. The position and orientation data of the tracker interface may be translated into position and orientation data of the instrument using the identity data and/or the calibration data before generating the virtual representations of the surgical instrument relative the virtual representation of pre-operative plan.

Embodiments comprise a computer program product stored on a computer usable medium, comprising computer readable program means for causing a computer to carry out the embodiments of the methods disclosed herein when executed.

Embodiments comprise a system for associating a pre-operative plan with position and orientation of a surgical instrument in a surgical navigation system. The system comprises a surgical navigation module configured to generate a preoperative plan with a virtual representation of patient anatomy data; and a navigation system comprising at least one tracker attachable to an instrument to be tracked, and a localizer for tracking at least one of position and orientation of said at least one tracker. The at least one tracker may comprise a position transmitter and a tracker interface for attaching the at least one tracker to the instrument. The navigation system may be arranged to report tracking data comprising position and orientation of the tracker to the surgical navigation module. The surgical navigation module may be configured to generate tracked position and orientation of the surgical instrument as virtual representations of the surgical instrument relative virtual representations of pre-operative plan in separate parts of a split window depending on the tracking data.

Further embodiments of the invention are defined in the dependent claims.

The embodiments of attachment components, calibrations stations and methods, and methods for associating a pre-operative plan with tracking data are flexible and may be adapted to any orthopedic replacement system already existing on the market. The embodiments are particularly useful for replacement systems where multiple differently shaped instruments are used during the course of the intervention and where the operator desires access to a pre-operative plan. Methods and systems disclosed herein define how the system may associate the tracking data with a pre-operative plan without user intervention. Also, solutions described herein provides for configuring the system such that the system may be installed in different environments with maintained accuracy and without affecting the way the surgeon is used to work with the instruments he/she is familiar with, and accessing patient scan data in flexible ways. The embodiments do not impair the capabilities of the existing instruments; rather the operator gets access to real time data as well as data from a pre-operative plan that enhances the use of the instruments for a safer and more reliable outcome. Hence, the system is safe and reliable. Furthermore, the system can be adapted to any tool of any orthopedic replacement system. This means that the same system may be used by different surgeons for different interventions, such as by exchanging attachment components, incorporating indicators in plan data that may be used to generate different views of virtual representations and depending on tracking data of the trackers. Different surgeons for the same intervention can adapt the components and systems to his/her desire without impairing tracking of the instruments. Even the position tracker can be positioned in an optimal position, and the position and orientation of the tracker attached to the instrument adapted to an optimal position and orientation relative the position tracker within the specific environment within which the system is deployed. For example, this provides for association of the tracking data with the preoperative plan reliably and accurately in the virtual world. This means that the system can be used with any replacement system in virtually any environment with maintained accuracy while the operator uses the tools and instruments he/she is familiar with.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIGS. 6a-6d are schematic views of a calibration process for calibrating the position and orientation of an instrument within a navigation system;

DESCRIPTION OF EMBODIMENTS

Figure 1A:
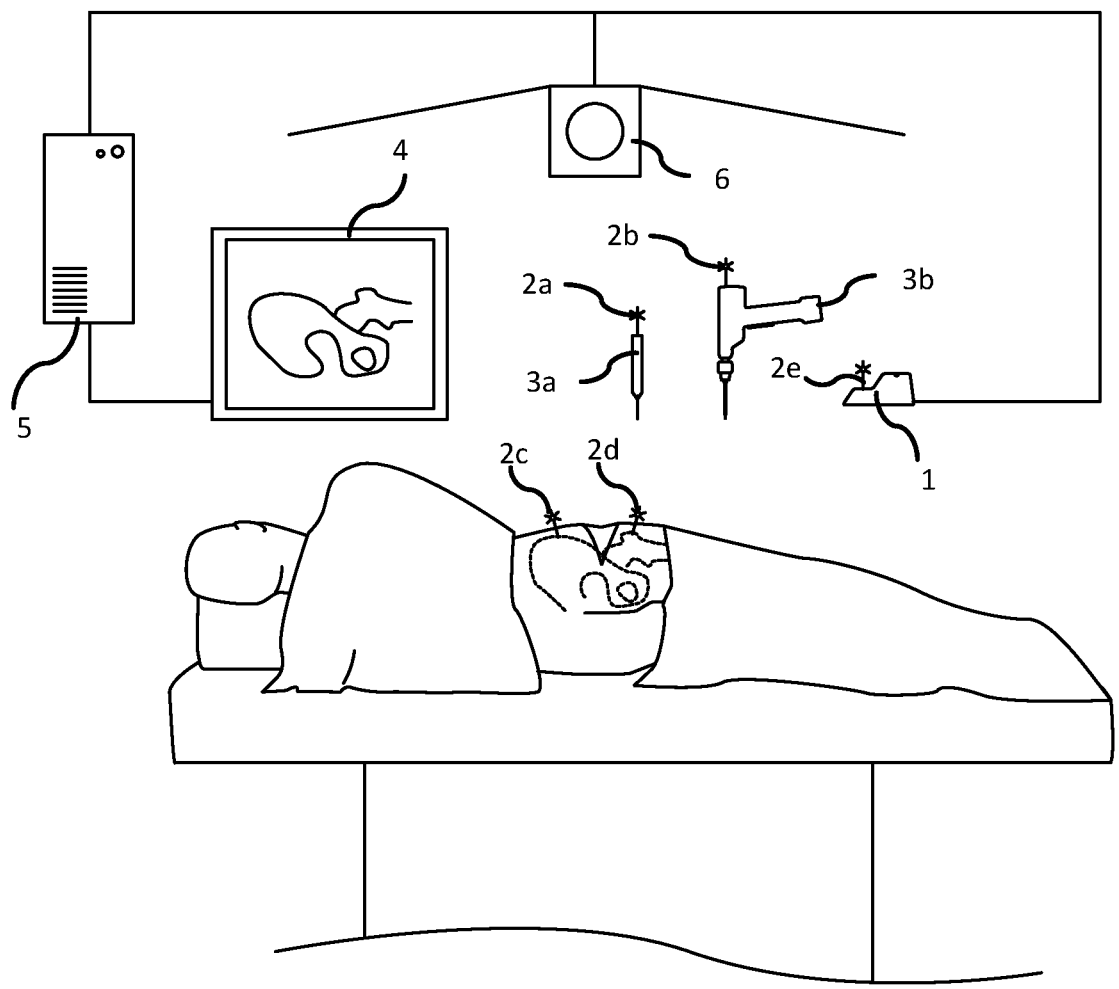
FIGS. 1a-1c are schematic views of a surgical navigation system.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The following description focuses on embodiments of the present invention applicable to a surgical navigation system. However, it will be appreciated that the invention is not limited to this application but may be applied to many other procedures, such as other navigation systems where the position and/or orientation of an object is tracked. The examples given in the below embodiments relate to a hip replacement surgery and spine surgery. Other embodiments include knee surgery, spine surgery, elbow surgery, ankle surgery, and other replacement surgeries.

In the below embodiments, reference is made to tracking position and orientation of instruments. In this context, the term instruments, in addition to instruments for the surgical examples given herein, include implant components, such as for replacement of patient anatomy or adding into the patient anatomy, as well as for temporary attachment of components of the replacement system during the surgical intervention. Such temporary components may include threaded screws or unthreaded nails for temporary attaching trackers to the patient anatomy during surgery in the same way as the trackers are attached to the attachment components, as will be described herein.

Furthermore, instruments include surgical guides that may attached to the anatomy or implants for guiding the instrument or checking accuracy of an installed implant, such as checking rotation, position, and/or orientation of an implant.

Figure 1B:
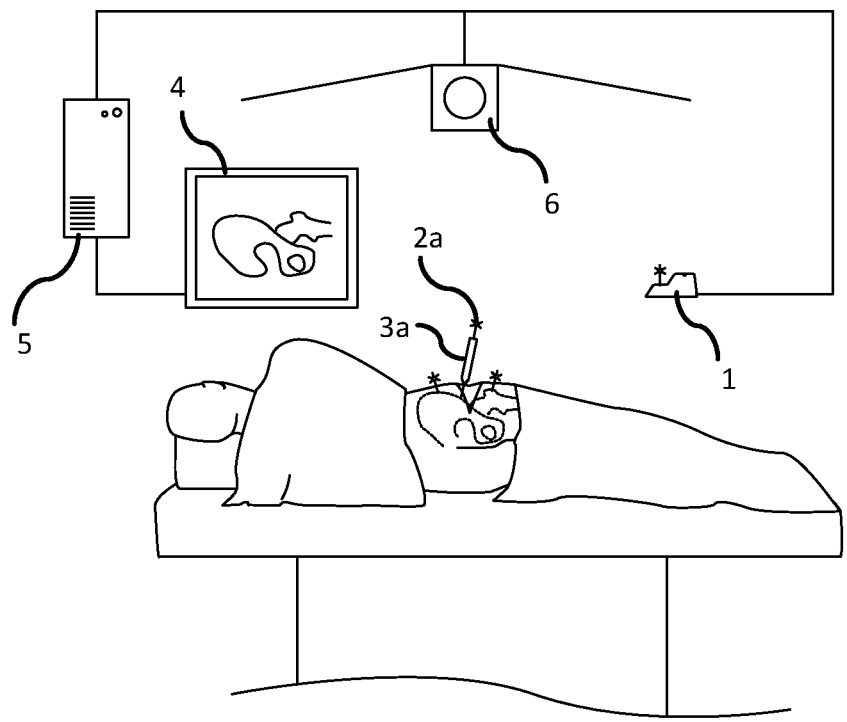
Figure 1C:
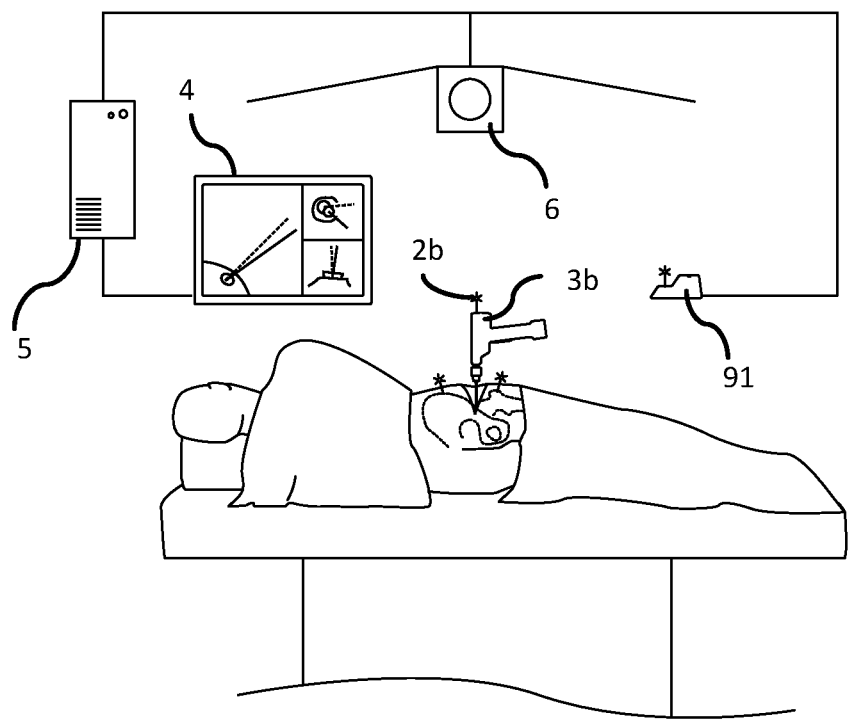

FIGS. 1a-1c illustrate embodiments of a surgical navigation system. Parts of this system have been disclosed in patent application no. PCT/SE2013/050952 by the same applicant as the applicant of the present invention, which is incorporated herein in its entirety for all purposes. The surgical navigation system of patent application no. PCT/SE2013/050952 has been further improved by embodiments of the present invention.

The surgical navigation system comprises a calibration unit 1. Furthermore, the navigation system comprises at least two trackers 2a, 2b, 2c, 2d, 2e. In the present example, five trackers 2a-2e are illustrated. However, a particular tracker may be moved between various instruments 3a, 3b depending on the particular work-flow of the surgery at which the system is used. The complete system may be used with only two trackers 2a-2e. A particular tracker 2c, 2d may also be attached to an implant, e.g. a temporary screw or nail, which in turn is attached to patient anatomy for tracking position and orientation of the patient anatomy during surgery. A tracker may also be attached to an implant to guide positioning of the implant and/or check positing and orientation of the implant after it has been seated. The calibration unit 1 may be adapted to calibrate at least one of position and orientation of any tracker 2a-2e associated with an instrument or implant within the surgical navigation system. Calibrating the tracker position and/or orientation allows for calibrating the position and orientation of the surgical instrument 3a, 3b, such as an end-effector and/or axis thereof. The surgical navigation system is provided within the surgical theatre or operating room.

FIG. 1b illustrates an instrument 3a in the form or a probe, which may be used to locate the position of various structures, e.g. patient anatomy, landmarks, etc. which have a correspondence in a preoperative plan such that the structure can be registered to a corresponding virtual structure in a preoperative plan. Such a virtual structure may comprise a surface representation of patient anatomy obtained from CT data.

FIG. 1c illustrates tracking the position and/or orientation of a surgical instrument 3b. The surgical navigation system also comprises a feedback unit, such as a display 4. The patient structure may be aligned with the virtual structure during a registration process. Utilizing the components of the surgical navigation system, the position and orientation of the surgical instrument 3b relative to the pre-operative plan and the patient structure may be tracked in real-time, such as illustrated in FIG. 1c, wherein the position and orientation of a virtual representation of the surgical instrument is displayed in relation to the virtual structure in the preoperative plan in the same relationship as the surgical instrument 3b to the patient structure in real-time. A straight line representing the axis of the surgical instrument 3a may be shown as the virtual representation on the display 4 relative the virtual object. The pre-operative plan may be provided from a software module for planning a surgical intervention based on CT or other 3D patient specific data including data of the anatomy subject of the surgery. The virtual representation of the surgical structure shown on the display 4 may be surface models segmented based on the patient specific data. The display 4 and surgical navigation system may be connected to and implemented by a computer 5 for processing data from the navigation system. The computer 5 may render the pre-operative plan and the position and orientation of tracked instruments 3a-3b relative the pre-operative plan. A position tracker 6 or localizer, such as an array of cameras or receiver of radio based position data, is configured to track current position and/or orientation of the trackers 2a-2e in its area of coverage.

According to embodiments, the tracker 2a-2e comprises a tracker interface, i.e. an attachment interface, for attaching the tracker to another object in a fixed position. The coordinate system of each tracker 2a-2e is defined relative the tracker interface. Other objects or structures of the tracker are calibrated or characterized against the tracker interface. This means that the tracker can track an object, such as an instrument, of arbitrary shape and be attached at an arbitrary position relative to the object. For example, the tracker interface may comprise a chuck. In the embodiments of a surgical navigation system, this means that the tracker can be attached to any surgical instrument at any position thereof, to which the chuck can be attached. This, in turn, means that the navigation system can be easily adapted to track components of any replacement system, such as surgical instruments and implants. Hence, the surgical navigation system is very flexible.

In order to make the system even easier to implement, and/or configure to a replacement system that has not been previously supported, embodiments of the present invention comprises an attachment component. The attachment component provides a precise tracker interface on an instrument that does not have such a tracker interface when it was made. Hence, replacement systems already available can be retrofitted with a navigation system. The attachment component can be produced by rapid productions techniques, such as 3D printing. It may be designed such that it fits to the instrument in a position where it may be fixed, and the attachment component and instrument form a rigid body, at least temporarily.

FIGS. 2a-2e illustrate various attachment components 10a-10d for attachment of a tracker 2a-2e to different objects, such as surgical instruments 14a-14c or implants. In the following, reference is made to an instrument as an example of an object, but may equally be an implant or other object of a replacement system.

The attachment component 10a-10d is provided for attaching the tracker to the instrument such that the tracker 2a-2e, the attachment component 10a-10d, and the instrument 3a-3b forms a rigid body in use. The attachment component 10a-10d may be retrofitted into a fixed non-moveable position relative the instrument such that the position and orientation of the instrument may be tracked by tracking the position and orientation of the tracker 2a-2e. The position and orientation of the tracker relative the instrument is arbitrary and does not need to be known.

Each attachment component 10a-10d comprises a body 11a-11d, an instrument interface 12a-12d, and a tracker interface 13a-13d. The instrument interface 12a-12d is attached to the body 13a-13d. Also, it may be configured for detachable attachment of the attachment component to the surgical instrument 3a-3b, such as at a predefined position and orientation. Hence, the tracker is not moveable relative the instrument 3a-3b while it is tracking the instrument 3a-3b. However, it may be removed at other times, such as during sterilization of the instrument 3a-3b. The attachment component may be delivered as a pre-sterilized consumable or be a sterilizable multiple-use component.

Furthermore, the tracker interface 13a-13d may be attached to, such as formed integral with or be connectable to, the body 13a-12c. The tracker interface 13a-13d may have a fixed pre-defined shape for engagement with a tracker interface of the tracker, which may be calibrated. This means that the attachment component 10a-10d, and any object attached in an arbitrary position and orientation thereto are defined relative the tracker interface 13a-13d of the attachment component 10a-10d. Furthermore, the instrument interface 12a-12d has an arbitrary un-calibrated position relative the tracker interface 13a-13d. Hence, the navigation system does not know the position and orientation of the instrument interface 12a-12d relative the tracker interface 13a-13d. This is possible since the coordinate system of the tracker 2a-2e is provided at a location that may be shared by the tracker interface of the tracker 2a-2e and the tracker interface 13a-13d of the attachment component 10a-10d. The body 11a-11d, the instrument interface 12a-12d, and the tracker interface 13a-13d of the attachment component 10a-10d may form a rigid body in use. Hence, the tracker 2a-2e, the attachment component 10a-10d, and the instrument 3a-3b form a rigid body unit in use when the tracker 2a-2e is attached to the tracker interface 13a-13d of the attachment component 10a-10d and the instrument 3a-3b is attached to the instrument interface 12a-12d to provide a fixed relationship between the tracker interface of the tracker 2a-2e and the surgical instrument 3a-3b.

In some embodiments, the instrument interface 13a-13d is arranged at an arbitrary un-calibrated position and orientation relative the tracker interface 13a-13d. This arbitrary un-calibrated position and orientation may be adjustable, such as to different fixed relative positions and/or orientations. In order for the tracker interface 13a-13d to form a rigid body with the body 11a-11d and the instrument interface 12a-12d, the adjustable arbitrary un-calibrated position and orientation may be locked at different positions and orientations such that the tracker interface 13a-13d has a fixed position and orientation relative the body 11a-11d in use. This provides for arranging the tracker 2a-2e in an optimal position and orientation relative the position tracker 6 independent of the position and orientation of the position tracker 6. For example, the layout or the operating room and other surgical equipment may impose restrictions on the position and orientation of the position tracker 6. It may need to be positioned differently relative the patient in different operating rooms, or even in the same operating room depending on the circumstances, type of surgical procedure etc. That means that the line of sight between the position tracker 6 and the tracker 2a-2e when the surgeon uses the instrument may be sufficient at one position of the position tracker 6, but blocked from another positions of the position tracker 6 if the relative position of the tracker interface 13a-13d is fixed and not adjustable. On the other hand, when the tracker interface 13a-13d is adjustable relative the instrument interface 12a-12d, the position and orientation of the tracker 2a-2e, when attached to the instrument 3a-3b, relative the position tracker 6 can be adjusted to an optimal position for a clear line of sight while instrument can be used as desired. The same applies if different surgeons orient the same instrument differently during use. The tracker 2a-2e can be arranged at an optimal position for a clear line of sight for each surgeon. Hence, the system is more flexible. Once the position of the tracker interface 13a-13d relative the instrument interface 12a-12d has been adjusted and locked, calibration may commence as is described below.

At least the body 11a-11d and the instrument interface 12a-12d of the attachment component 10a-10d may be formed as an integral unit. Hence, precision and accuracy is provided for. Furthermore, the instrument interface 12a-12b may comprise at least one recess 20b-20d for engagement with the surgical instrument, such as is illustrated in FIGS. 2b, 2d and 2e. The instrument interface 12a-12d may have a shape that is specific for each instrument, such as a shape that is complementary to the shape of an exterior surface of the instrument. This enables a stable and fixed attachment of the attachment component 11a-11d. However, the position and orientation of the tracker interface 13a-13d of the attachment component 11a-11d may still be unrelated to the position and orientation, and thus shape, of the instrument. This also provides for precision and reliability, such that the components may not be disengaged by mistake and such that the coordinate system of the tracker 2a-2e is shared at the respective tracker interfaces 13a-13d.

Alternatively or additionally, the instrument interface 12a-12d of the attachment component 10a-10d may comprise at least one clamp for clamping the attachment component 10a-10d to the instrument 3a-3b. In the embodiment of FIG. 2b, the instrument interface 12b is annular with a recess in the axial direction of the instrument and though the body in order to provide sufficient flexibility to the body 11b such that a snap fit connection is provided. The snap-fit instrument interface may have a ridge or rim that engages an annular recess of the surgical instrument 14b. In the embodiment of FIG. 2d, the recess 20c provides an opening for inserting a shaft of the surgical instrument 14c, such as a spine punch tool. Also illustrated with regard to this embodiment is a handle of the surgical instrument received in the instrument interface 12c. The handle is in this embodiment spherical whereas the instrument interface is part spherical. Hence, the shape of the instrument interface 12c may at least partly conform to a shape of a handle of the instrument 14c. Other shapes of the handle are conceivable.

Figure 2A:
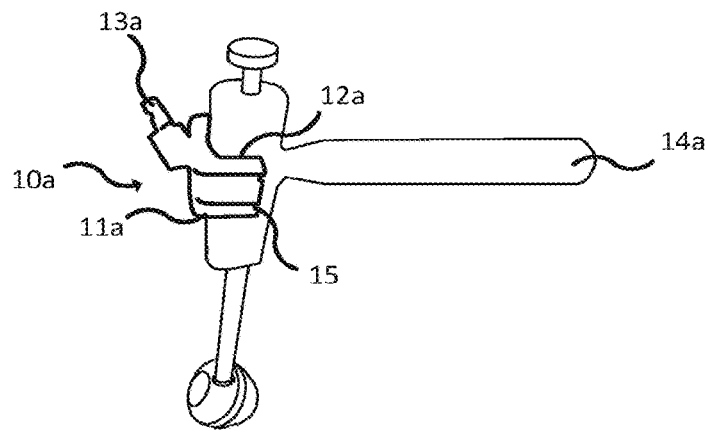
FIGS. 2a-2e are perspective views of attachment components having a tracker interface and an instrument interface.
Figure 2B:
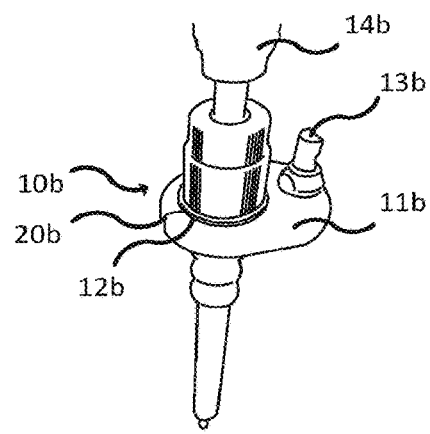
Figure 2C:
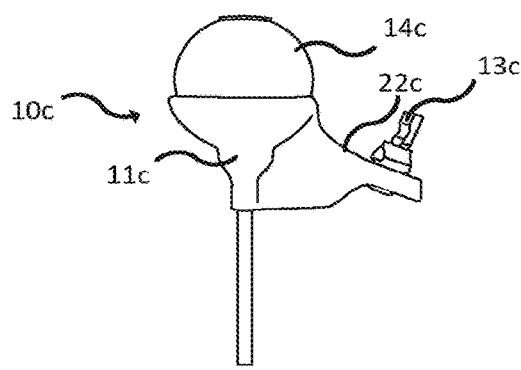
Figure 2D:
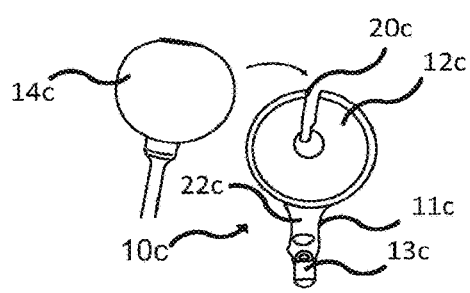
Figure 2E:
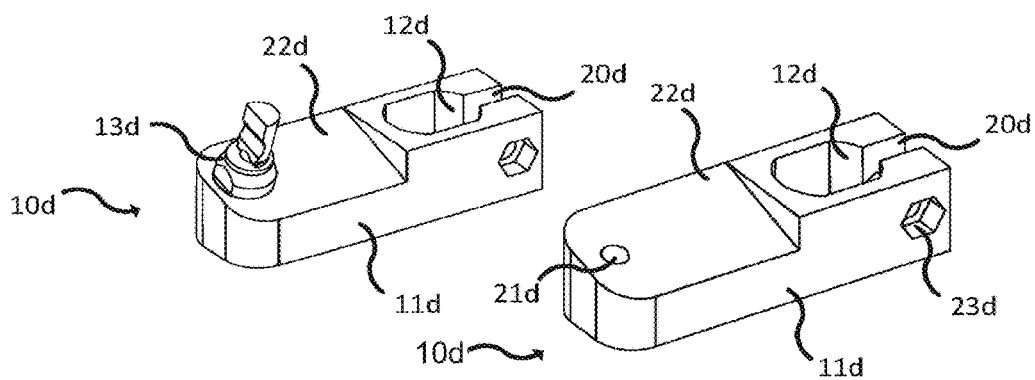

As is illustrated in the embodiment of FIG. 2a, the attachment component may comprise a recess 15 that extends around, or partially around, the body 11a. The recess may be sized and configured to receive a tie or band, such as a rubber band or cable tie, that wraps around the body 11a and a portion of the instrument, such as a handle thereof. The tie or band and instrument interface forms a clamp for clamping the attachment component 10a to the instrument 14a.

FIG. 2e illustrates an embodiment wherein at least one of position and orientation of the tracker interface 13d is adjustable relative the position and orientation of the instrument interface. To the left in FIG. 2e, the tracker interface 13d is attached to the attachment component 10d, and to the right, the tracker interface 13d is detached from the attachment component 10d. For example, the tracker interface may be attached to a base, as will be described below. A stud or protrusion (not shown) may extend from the base in the longitudinal direction of the tracker interface 13d, and be received in a recess 21d of the body 11d. In the illustrated embodiment, the recess 21d and stud are cylindrical such that the tracker interface 13d may be rotated relative the longitudinal axis of the instrument interface 12d, whereby its position and/or orientation is adjusted.

The body 11d may comprise several recesses for receiving the stud. Hence, also the position of the tracker interface 13d relative the instrument interface 12d may be adjusted. The tracker interface 13 may be fixed in a desired location and orientation relative the body 11d, such as by applying an adhesive in the recess 21d. Additionally or alternatively, a press fit connection between the stud and recess 21d may provide sufficient fixation of the tracker interface 13d such that it does not move during operation of the instrument. In this embodiment as well as in the embodiment of FIGS. 2c-2d, the body 11c-11d comprises a surface 22d that is non perpendicular relative the instrument interface 12-c-12d. Hence, the longitudinal axis of the tracker interface 13c-13d will be non-parallel to the longitudinal axis of the instrument, and improved line of sight may be obtained. Furthermore, the body 11c-11d may comprise multiple such non-perpendicular surfaces 22c-22d at which the tracker interface 13c-13d may be attached to the body 11c-11d to accommodate for different situations, wherein each surface 22c-22d may comprise at least one recess 21d for receiving the stud.

Furthermore, in some embodiments, the base of the tracker interface comprises a lockable swivel joint, by means of which the tracker interface 13a-13d may be rotated and/or tilted relative the instrument interface 12a-12d. Such a swivel joint may be provided by a ball received in a seat or socket, and the ball locked to the socket by a screw or nut pressing the ball towards the socket to a locked position. The swivel joint provides for an adjustable position and/or orientation of the tracker interface 13a-13d.

As is illustrated in FIG. 2e, the body 11d may have a recess 20d extending in the longitudinal direction of the instrument interface 12d whereby two arms are formed by the body that extends transverse to the instrument interface. The instrument may be received into the instrument interface 12d through the recess 20. The instrument interface 20d may be clamped to the instrument by tightening the arms around the instrument. The arms may be tightened by a snap fit connection, or by a bolt (not shown) received in a recess 23d transverse to the arm. The head of the bolt may be received in one of the arms, and a nut or threads provided in the other arm. Closing the arms will clamp the attachment component 10d to the instrument.

The attachment component may be made by a sterilizable material, such as medical grade plastics or metal. Components made of medical grade material are particularly suitable for rapid prototyping, such that attachment components easily can be manufactured and navigation of additional instruments made possible without any adaptation of other components of the navigation system or databases in the system.

Figure 3:
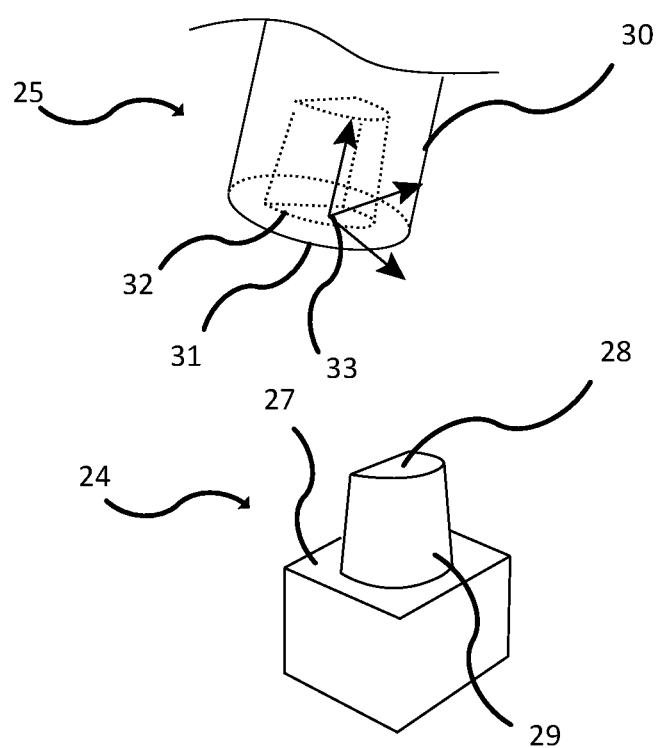
FIG. 3 is a perspective view of a tracker interface of the tracker and a tracker interface of the attachment component.

FIG. 3 illustrates an embodiment of the tracker interface 24 of the attachment component and the tracker interface 25 of the tracker (the attachment component and tracker are not illustrated in FIG. 3). A fixed predefined shape of the tracker interface comprises an anti-rotational feature, which may be non-circular and non-spherical. This provides f anti-rotational engagement of a surface of the tracker interface 25 of the tracker to a surface of the tracker interface 24 of the attachment component having a complementary shape. In this embodiment, the anti-rotational feature of the tracker interface 24 of the attachment component is a flat or planar surface of an otherwise cylindrical or conical surface. The flat surface extends in the longitudinal direction of the tracker interface 24, 25. Alternatively, the anti-rotational feature may be a surface that is square, hexagonal, star shaped, oval, wave shaped or any other non-circular shape in a cross section taken along the longitudinal axis of the tracker interface 24. The tracker interface 24 of the attachment component may comprise a protrusion having a base 27, or extending from a base surface, and a top 28. The base 27 may be wider than the top 28. Hence, an envelope surface 29, which extends from the base 27 to the top 28, may be conical, such that the tracker interface 23 forms a truncated cone, which may comprise the flat side surface. In some embodiments, the envelope surface 29 is circular such that the tracker may be rotated around the protrusion to a suitable orientation relative the instrument before it is locked to the attachment component. This contributes to the flexibility of the system. A recess or protrusion may be provided in the envelope surface 29 at least partly around the circumference of the protrusion, and which may be transverse to the longitudinal axis of the tracker interface. A locking element of the tracker interface 25 of the tracker may engage the circumferential protrusion or recess. The locking element may comprise an eccentric member that engages the circumferential recess, as will be discussed below.

The tracker interface 25 of the tracker may comprise a boss 30 with a generally flat or planar end surface 31, which may be part of or form a tip of the tracker, and a recess 32, which is indicated with phantom lines. The recess 32 may have a shape that is at least partially complementary to the shape of the envelope surface 29, such that the tracker interface 25 provides a location fit, i.e. the tracker interface 24 of the attachment component does not move relative the tracker interface 25 of the tracker when the tracker interfaces 24, 25 are completely seated. As is indicated in FIG. 3, the origin or zero point 33 of the coordinate system of the tracker may be located at the center of the boss 30 or recess 32. In the embodiment of FIG. 3, the origin 33 of the coordinate system of the tracker is located at a plane coinciding with a plane formed by the flat end surface 31. When the tracker interfaces 24, 25 are connected, the base 27 will abut the end surface 31. Hence, by tracking the end surface, components in the system may be related to this surface in order to provide transformation of the position and or orientation of other components rigidly attached relative the tracker.

The tracker interface 23 of the attachment component comprises a locking feature, for locking engagement of the tracker interface to a tracked surface of the tracker, which may be formed by the end surface 31. The tracker interface 25 of the tracker may comprise a chuck, as will be discussed below.

The tracker interface of the attachment component has been disclosed as having a protrusion and the tracker interface of the tracker as having a recess for receiving the protrusion. In other embodiments, the system is reversed such that the tracker interface of the attachment component comprises the boss and recess and the tracker interface of the tracker comprises the protrusion and base.

Returning to FIGS. 2a-2d, embodiments of the invention comprises a set of attachment components. The set of attachment components may comprise at least two attachment components as described herein. The instrument interfaces of at least two of the attachment components have different geometrical shapes. Hence, each instrument interface is configured for a specific instrument that is used during a particular surgical procedure. However, the tracker interfaces of at least two of attachment components of the set have identical geometrical shapes. The set of attachment components may be configured for instruments and/or implants of a particular surgical procedure. As such, the set may be provided as a kit for each surgery, together with or separate from the implants. A single tracker may be selectively attached to each attachment component of the set during the procedure. Hence, the number of trackers in the system may be reduced compared to having a tracker for each instrument or attachment component.

Each attachment component may further comprises an electronically readable identifier configured to identify at least one of instrument brand and instrument type of the instrument, for which the instrument interface of the attachment component is configured. The electronically readable identifier may comprise a transmitter for wirelessly transmitting an identification code. Such an electronically readable identifier may include an RFID tag, a bar code, a QR code, or similar code that is electronically readable. If the system identifies that the attachment component is not configured for a particular replacement procedure, the system may present warnings. For example, a warning may indicate that a particular replacement component may not be accurately or reliably attached to the instrument to be used for the surgery. The instrument to be used may be defined in the system or in a preoperative plan.

Figure 4:
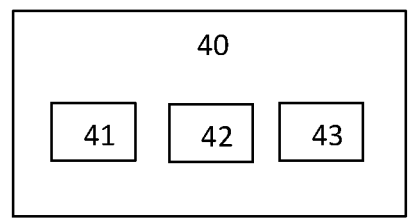
FIG. 4 is a block diagram of a surgical navigation system including a navigation system.

FIG. 4 illustrates main components of a surgical navigation system 40. The surgical navigation system may comprise a navigation system 41, a CAD module 42, the attachment components 10a-10d and a calibration station 43, which will be further described below. The CAD module 42 may comprise patient specific volumetric data and object models based on the volumetric data. The CAD module 42 may also comprise a pre-operative plan, in which implant component positions and orientations and/or instrument paths have been defined relative the patient specific data. The navigation system 41 can be provided as a stand-alone component within the surgical navigation system 40. This means that the navigation system provides to the CAD module 42 the position and orientation of each tracker interface of each tracker 2a-2e in the area of coverage of the navigation system 41. Furthermore, the navigation system 41 may provide data of the position and orientation of a tracker interface of a tracker attached to a calibration station, as will be discussed below. At calibration, the CAD module 42 may generate a transformation database or table for each attachment component and instrument combination, such that the position and orientation of a tracked surface of the attachment component 10a-10d is known for determining position and/or orientation of the surgical instrument 3a-3b. The tracked surface of the attachment component 10a-10d may be the base surface 27 of the tracker interface 24. Hence, the navigation system 41 only needs to report the position and orientation of the tracker interface 25 of the tracker, which mates with the tracked surface of the attachment component 10a-10d. This means that the surgical navigation system 40 is independent of the technology of the navigation system 41. The only requirement of a replacement navigation system 41 is that it reports the position and orientation of the tracker interface, and potentially tracker identity data as will be discussed below, and that the replacement navigation system has a tracker interface that corresponds to the old tracker interface and fits the tracker interface of the attachment component. Hence, the surgical navigation system is very flexible. Furthermore, combinations of attachment components and instruments can be added to the surgical navigation system at any time by calibrating the attachment component and instrument combination, as will be described below. This makes the system very easy to adapt to new replacement systems and new instruments made available to already supported replacement systems.

Figure 5A:
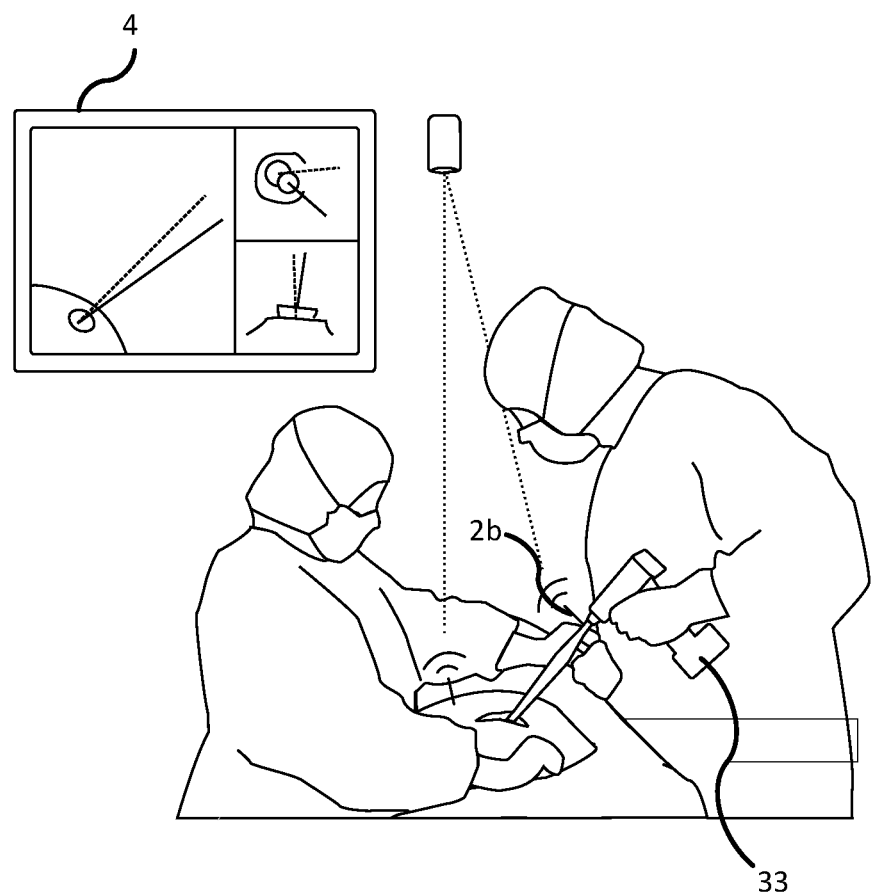
FIGS. 5a-5e are schematic views of a method and a system for associating position and orientation of a surgical instrument relative a pre-operative plan.

As is illustrated in FIG. 5a, the tracker 2b may be attached to the surgical instrument rather than a surgical tool 33, such as a drilling machine, a planar machine, a sawing machine etc. This means that the surgeon may use the same machine for different interventions during the surgical procedure, and may simply disconnect the surgical instrument and attach a new surgical instrument without having to calibrate the instrument and attachment component combination, wherein flexibility of the system is maintained. A set of attachment components is useful in this situation. Furthermore, FIG. 5a illustrates a surgical navigation module that may comprise the CAD module 42 and the display 4, as will be further described below.

FIGS. 5b-5e illustrate embodiments of a method and system for associating the pre-operative plan with position and orientation of the surgical instrument 3a, 3b, such as by the CAD module 42. The pre-operative plan may be generated in a planning module. Such a planning module has been described in PCT/SE2013/051210, by the same applicant as the applicant of the present invention and which is incorporated herein by reference in its entirety for all purposes. The pre-operative plan comprises patient anatomy data, such as a scan data including the patient anatomy, for example bony anatomy of the patient. Such scan data may comprise volume imaging data, such as CT data, MRI data, PET data, SPECT data etc. The pre-operative plan may also comprise planned position and orientation of an implant and/or surgical instrument relative the patient anatomy data. The pre-operative plan may also comprise trajectories of the surgical instrument for a planned outcome, such as the trajectory of a cut or drilling action. Furthermore, the pre-operative plan data may comprise surface models, such as STL models, generated based on the patient anatomy data. The pre-operative plan may also comprise a combination of the indicated data types. Hence, the pre-operative plan comprises large sets of data that the surgeon may benefit from during the surgical procedure but which he/she has previously not had access to during the surgical intervention. The surgeon can simply not see beyond the surfaces exposed during the surgical intervention, and cannot imagine any structure hidden by the exposed surfaces. The present embodiments provide access to patient data available during a pre-operative planning process, but now during the surgical intervention without having to manually interact with the pre-operative plan. The pre-operative plan may be a pre-operative plan of a hip, a spine, such as spine fusion, pedicle screw placement, orthopedic joint surgery, an foot and ankle, shoulder, or elbow surgery.

The pre-operative plan is not described in further detail herein. For further details of the pre-operative plan, reference is made to PCT/SE2013/051210. The pre-operative plan may e.g. be imported into the CAD module 42. Alternatively or additionally, a module for preparing the pre-operative plan is provided as a module within the CAD module 42.

Initially, the pre-operative plan is not associated with the position and orientation of the surgical instrument 3a, 3b. Embodiments herein provide a system and a method, wherein the pre-operative plan is associated with the position and orientation of a tracked surgical instrument. According to these embodiments, a link is provided between the pre-operative plan and the navigation system while the instrument is used. Hence, the system can continuously update a virtual representation of the pre-operative plan while the surgeon moves the surgical instrument. Hence, the system makes the pre-operative plan useful also during use of the instruments that are planned for in the pre-operative plan.

The surgical instrument may comprise a probe to locate a particular landmark. The surgical instrument may also comprise a surgical template, such as a template to be attached to an implant or anatomical structure in order to indicate its position and/or orientation. Hence, the method may be non-invasive and exercised by a non-medically trained operator. In the following, reference is made to a surgeon, but this may equally be a non-medically trained operator. The embodiments provides a user friendly system, wherein user interaction with the system is minimized and still the surgeon can benefit from the data that was used during the pre-operative plan in real time during surgery. Since this may be combined with the surgical navigation system presented herein, the surgeon may operate with conventional tools that he/she is familiar with but guided by enhanced information that was also used during a pre-operative planning process.

The method and system for associating a pre-operative plan with tracked position and orientation of the instrument will now be described in relation to FIGS. 5b-5e, which disclose various embodiments of the method and system.

A pre-operative plan including patient anatomy data is provided. In some embodiments, the pre-operative plan includes only patient anatomy data, such as scan data. An instrument is associated relative the patient anatomy data only such as relative bone tissue of the anatomy data. This is useful e.g. in order to locate various structures of the patient without having to manually manipulate the patient data on a display. It is difficult to manually orient the patient data in the system such that it is oriented relative to an instrument using an input device, such as a mouse. The instrument in such an embodiment may be a pointer or probe. In other embodiments, the preoperative plan comprises planned position and orientation of a surgical object relative the patient anatomy data. The surgical object may be an implant, surgical guides, surgical instruments, incision or cutting lines or planes etc. i.e. an object that is external to the patient anatomy data and/or external to scan data of the patient.

The pre-operative plan may be imported into the CAD module 42, such as indicated above. The position and orientation of a patient anatomy within the navigation system is obtained, such as by the navigation system, when a tracker is attached to the patient anatomy. Also, the patient anatomy is referenced to a virtual representation of the patient anatomy data in the preoperative plan using the navigation system, such as has been described above. The patient anatomy and the virtual representation of the patient anatomy may be dynamically referenced such that position and orientation of the patient anatomy is continuously tracked and displayed on the display 4. The tracking data contains information of position and orientation of the instrument 3a, 3b within the navigation system, such as is described herein, i.e. relative the patient anatomy.

The method and system for associating the pre-operative plan with the tracking data comprises a split window 50. The split window comprises separate parts 51a, 51b, 51c, 51d. Multiple virtual representations of the surgical instrument 52 are generated relative multiple virtual representations of the pre-operative plan depending on the tracking data. Each virtual representation of the surgical instrument 52 is generated in relation to a virtual representation of the pre-operative plan in one part of the split window 50. The multiple virtual representations of the pre-operative plan are updated based on the position and orientation of the instrument, i.e. they are dependent on the tracking data. Different aspects of the pre-operative plan may be displayed in the separate parts 51a, 51b, 51c, 51d depending on the position and orientation of the instrument relative the patient anatomy. This provides the surgeon with different types of data and/or different views of the same data without having to manually interact with the system, which is controlled by the tracked position and orientation of the instrument. This makes the system more intuitive and flexible to requirements of different replacement systems and procedures. Different replacement systems or procedures may require access to different types of data. This is catered for with embodiments of the system for associating the pre-operative plan with the tracking data.

Figure 5B:
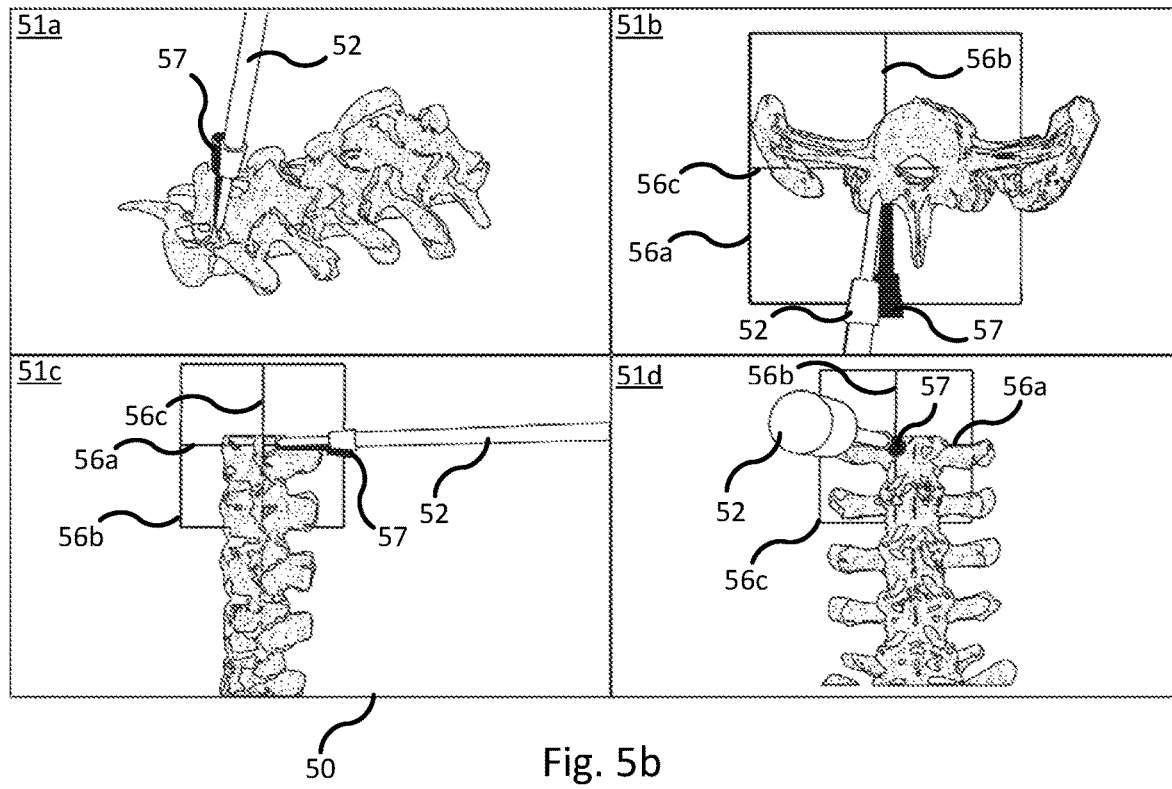
Figure 5C:
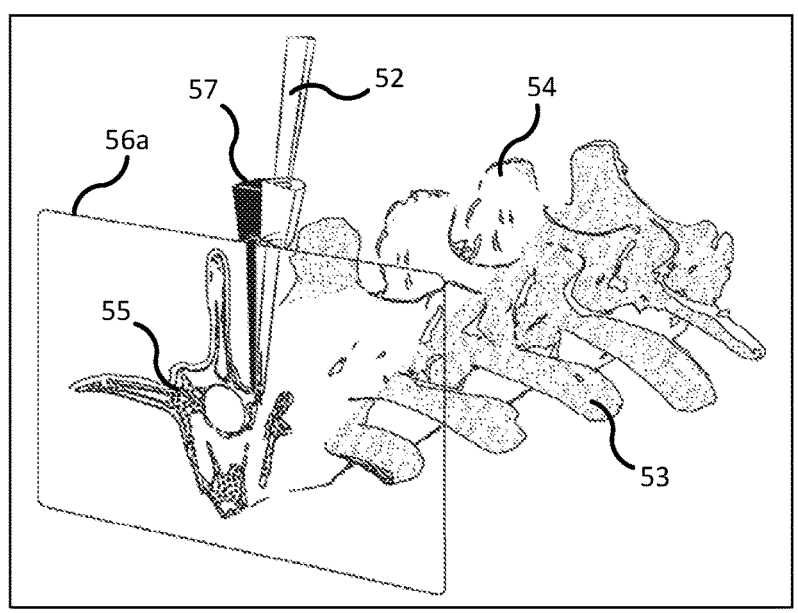
Figure 5D:
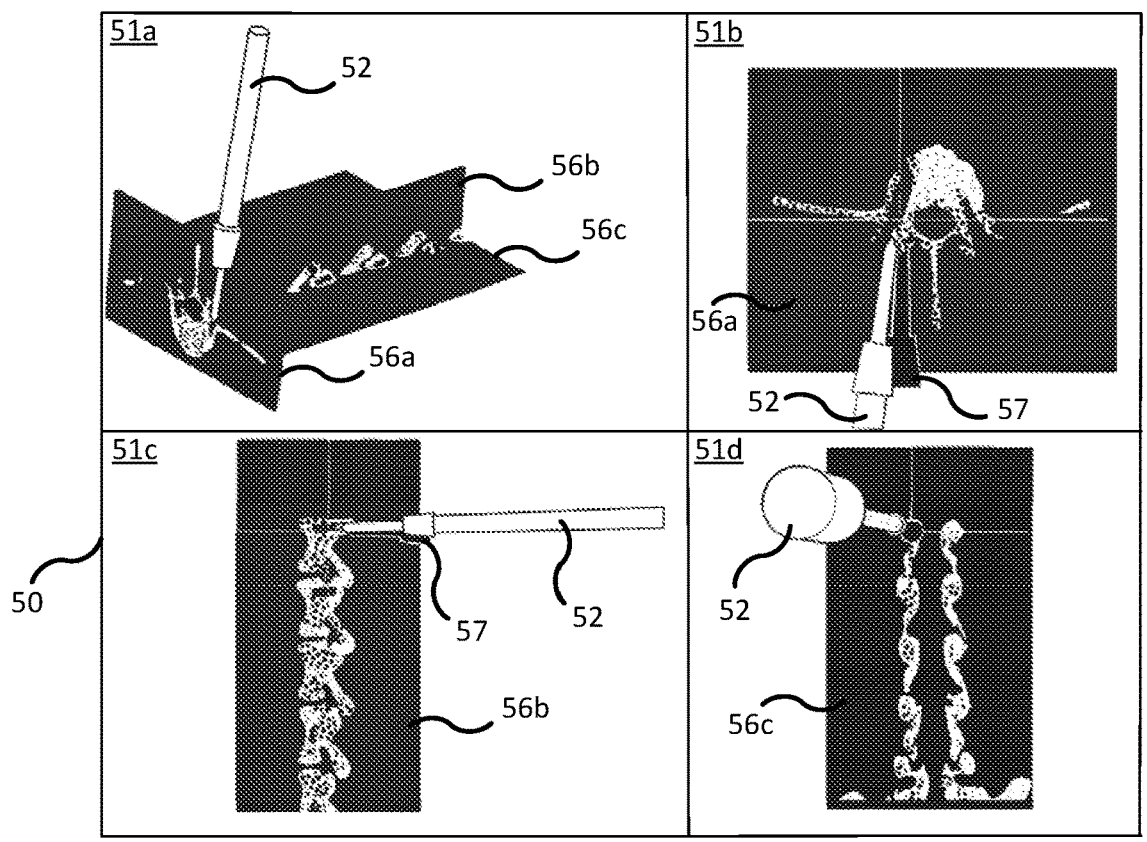

As is illustrated in FIG. 5c, the virtual representation of the pre-operative plan may comprise at least one of volumetric data 53 (smaller dots), an object representation 54 (solid white), and grey value data 55 (larger dots). These different types of patient data may be generated simultaneously or separately by showing and hiding the different types of data in any of the separate parts 51a, 51b, 51c, 51d of the split window 50. In FIG. 5b, only volumetric data 53 is shown in all parts 51a, 51b, 51c, 51d of the split window 50. In FIG. 5d, only grey value data 55 is shown in all parts 51a, 51b, 51c, 51d of the split window 50. The object representation may comprise a surface model, a wire frame, or a solid, generated based on imported volumetric patient data, implemented using 3D computer graphics, such as the CAD module 42. Volumetric data 53 may e.g. comprise voxel data obtained from the pre-operative plan, such as from a stack of CT images or MR data including the patient anatomy. Grey value data 55 may be calculated at an arbitrary re-slice plane generated from a stack of CT-images or from MR data. The virtual representation of the pre-operative plan may also comprise a virtual representation of an implant and/or instrument or instrument trajectory, or any other object in a planned position and orientation relative the patient anatomy in the preoperative plan.

Returning to FIG. 5b, at least one display plane 56a, 56b, 56c for generating the virtual representation of the patient data is fixed relative at least one dimension of the virtual representation of pre-operative plan or the virtual representation of the surgical instrument 52. Each display plane 56a, 56b, 56c may be indicated in each part 51a, 51b, 51c, 51d of the split window 50 in order to assist the operator in understanding the relative orientation of the data in each part 51a, 51b, 51c, 51d of the split window 50. All display planes 56a, 56b, 56c may visible, such as by a frame, also in the first part 51a. In FIG. 5b, the display planes are not visible in the first part 51a, whereas they are visible in the first part 51a in the embodiment of FIG. 5d. The display planes 56a, 56b, 56c may be filled a solid color, such as black, in order to resemble a tomographic slice of data and/or only show grey value data within the contours of a specific piece of anatomy, such as bone.

In the embodiment of FIG. 5b, the display planes 56a, 56b, 56c are fixed relative a dimension of an implant component 57 in the pre-operative plan. For example, any of the display planes may 56a, 56b, 56c may be fixed relative a landmark of the implant component 57 of the pre-operative plan, such as a rotational indicator of the implant component. Such rotation indicators may e.g. be provided on a cup for a hip replacement. This means that the association of the pre-operative plan and display planes is provided by the type of implant component. Additionally or alternatively, the dimension may be a longitudinal axis and/or a position of the implant component, such as a tip or center thereof.

The implant component 57 has a fixed planned position and orientation relative the patient anatomy data. Hence, the display planes 56a, 56b, 56c may also be fixed relative the patient anatomy data. The display planes 56a, 56b, 56c provide the viewing orientations of the virtual representation of the pre-operative plan in the various parts 51a, 51b, 51c, 51d of the split window 50.

In some embodiments, the display planes 56a, 56b, 56c are fixed relative a structure of the patient anatomy, such as a landmark of the patient anatomy, for example a ridge of the patient anatomy. A spinous process or a transverse process of a vertebrae may present such a landmark. Also, a portion of the pelvis, such as the acetabulum and/or the ridge thereof, may present such a landmark.

At least one of the virtual representations of the pre-operative plan is continuously updated depending on the tracking data. Also, the virtual representation of the surgical instrument 52 may be continuously updated in at least one part 51a, 51b, 51c, 51d of the split window 50 depending on the tracking data. As is illustrated in FIG. 5b, a 3D representation of the pre-operative plan is provided in a first part 51a of the split window 50, an axial or transverse representation of the pre-operative plan is provided in a second part 51b of the split window 50 providing an axial or transverse viewing orientation or display plane 56a, a sagittal representation is provided in a third part 51c of the split window 50 providing a sagittal viewing orientation or display plane 56b, and a coronal representation is provided in a fourth part 51d of the split window 50 providing a coronal viewing orientation or display plane 56c. In other embodiments, only one or two of the second part 51b, the third part 51c, and the fourth part 51d of the split window 50 are provided in combination with the 3D representation in the first part 51a of the split window 50.

Each display plane 56a, 56b, 56c may be orthogonal to the other display planes 56a, 56b, 56c. Furthermore, at least one of the display planes 56a, 56b, 56c may be parallel and/or coincide with a resliced plane for generating grey values from volumetric scan data, such as CT data. This is illustrated in FIG. 5c. The association of the pre-operative plan with the position and orientation of the surgical instrument may thus provide grey value data including structures beyond the surfaces that the surgeon can see while looking at the patient only. The re-slice plane may be generated at a position and orientation of the pre-operative plan that corresponds to a position and orientation of the instrument relative the patient anatomy. Hence, the re-slice plane follows or tracks the virtual representation of the surgical instrument, which provides for continues access to the pre-operative plan dependent on instrument position and orientation without having to manipulate the system.

As indicated above, a plurality of orthogonally arranged display planes 56a, 56b, 56c may be fixed relative at least one dimension of the virtual representation of the surgical instrument 52 or a portion of the pre-operative plan. The origin of the display planes 56a, 56b, 56c may e.g. be fixed relative the tip, center, and/or longitudinal or insertion axis of an implant component of the pre-operative plan. The position and orientation of the virtual representations of the surgical instrument 52 relative the plurality of orthogonally arranged display planes 56a, 56b, 56c may be continuously updated. Hence, it is also continuously updated relative the virtual representations of the pre-operative plan in each part of said split window depending on said tracking data. For example, axial or transverse data of the pre-operative plan may be generated in the second part 51b of the split window 50 depending on the position and orientation of the virtual representation of the surgical instrument 52 relative the virtual representation of the pre-operative plan. For example, as the virtual representation of the instrument 52 moves along the coronal display plane 56c, the virtual representation of the pre-operative plan is continuously updated in the transverse display plane 56a, such as if the display plane tracks the virtual representation of the surgical instrument 52. For example, the axial or transverse display plane 56a may be provided at fixed position relative the longitudinal direction of the virtual representation of the surgical instrument 52. The fixed position may be at the center of the virtual representation of the surgical instrument 52, such as illustrated in FIG. 5c, or at a predetermined distance relative the virtual representation of the surgical instrument 52, such as illustrated in FIG. 5b. The fixed position may be user defined, fixed in the system, dependent on the type of surgical procedure and/or type of implant component. Similarly, as the virtual representation of the instrument 52 moves along the axial or transverse display plane 56a, and/or the sagittal display plane 56b, position and orientation of the virtual representation of the surgical instrument 52 relative the virtual representation of the pre-operative plan may be continuously updated in the other display planes 56a, 56b, 56c.

The position and orientation of the display planes 56a, 56b, 56c may be based on a planned position and/or a planned orientation of the implant component of the pre-operative plane relative the patient anatomy data of said pre-operative plan. For example, the axial or transverse plane 56a may be oriented in the insertion direction of the implant component. In other embodiments, the axial or transverse plane 56a is aligned with the axial or transverse plane of the patient anatomy, for example if the axial or transverse plane of the patient anatomy is defined during the pre-operative planning. An indication of the orientation of the patient anatomy may be included in the pre-operative plan.

As is illustrated in FIG. 5b, at least one 3D representation is generated as the virtual representation of the pre-operative plan in the first part 51a of the split window 50. The 3D representation may be updated depending on the position of the virtual representation of the surgical instrument 52. For example, any of the display planes 56a-56c may be cutting planes. The 3D representation may be cut or not displayed on one side of the cutting plane, whereas it is displayed on the other side. At the same time, a 2D representation as the virtual representation of the pre-operative plan is generated in the second part 51b of the split window 50. The 2D representation may comprise volume and/or grey value data. Each of the 3D representation and the 2D representation is generated dependent on the tracking data.

Furthermore, grey value data from the patient anatomy data of the pre-operative plan may be generated in at least one of said separate parts 51a-51d of the split window 50 depending on the tracking data. As is illustrated in FIG. 5d, grey value data may be generated in any of the parts 51a-51d or the split window 50 relative the position of the virtual representation of the surgical instrument 52. Furthermore, at least two of grey value data, volume data, and surface data may be continuously generated based on the patient anatomy data of the pre-operative plan and in at least one of the separate parts 51a-51d of the split window 50 depending on the tracking data. This is illustrated in FIG. 5c, where all types of data are generated relative the position and orientation the virtual representation of the surgical instrument 52, such as the tip thereof. Hence, in some embodiments, the virtual representation of the surgical instrument 52 relative the virtual representation of the pre-operative plan may be generated in at least three orientations in three different parts 51a-51d of the split window 52 simultaneously and depending on the tracking data.

In some embodiments, orientation settings for at least one part 51a-51d of the split window 52 are obtained from the pre-operative plan. This may be user defined during the pre-operative planning procedure. Hence, the surgical navigation system may be used by different surgeons having their respective planning modules but yet do not have to define settings in the CAD module before commencing surgery using the same surgical navigation system. The settings may be automatically applied upon importing the pre-operative plan. Hence, the system is more user-friendly and intuitive. Alternatively, the settings are set in a user profile and applied upon logging into the surgical navigation system. The orientation setting defines the orientation of at least one virtual representation of the pre-operative plan in at least one part 51a-51d of the split window 50.

As is illustrated in FIGS. 5b and 5d, an axial or transverse representation of the pre-operative plan is generated in one part of the split window 50 and at least one of a coronal representation and a sagittal representation of the pre-operative plan is generated in at least one other part of the split window 50 and depending on the tracking data. The axial or transverse representation of the pre-operative plan may be continuously updated depending on the position of the virtual representation of the surgical instrument 52, as described above. However, the coronal and/or the sagittal representation may be static, whereas the position of the virtual representation of the surgical instrument 52 relative the static representation is continuously updated depending on the tracking data. Also, the 3D representation of the pre-operative plan in the first part 51a may be continuously updated. Grey value data may be continuously updated in the first part 51a of the split window 50 relative the 3D representation as well as in the second part 51b of the split window 50, but not in the other parts 51c-51d of the split window. Hence, an object representation of the patient anatomy and the virtual representation of the surgical instrument 52 may be generated in the first part 51a of the split window 50 depending on the tracking data. Also, volumetric representation and/or grey value representation of the patient anatomy and the virtual representation of the surgical instrument 52 may be generated in the second part 51b of the split window 50 depending on the tracking data.

As is illustrated in FIG. 5c, the object representation as well as an volumetric and/or grey value representation of the patient anatomy data and the virtual representation of the surgical instrument may be generated the first part 51a of the split window 50 depending on the tracking data.

The surface representation and the volumetric and/or grey value representation are at least partially offset in an axial direction of the patient anatomy. Hence, an offset is provided between the different representations of the pre-operative plan. This represents an accuracy indication of the system, such as to verify the accuracy of a segmentation process for generating the surface representation. Certain portions of the patient anatomy may have been classified as a particular type of anatomy, such as bone tissue, whereas it actually is a different type of anatomy, such as soft tissue. Presenting both types of representations allows the surgeon to verify the accuracy of the segmentation process. The transverse cutting plane in the first part 51a may track or follow the position of the virtual representation of the instrument 52, such as a tip thereof, but the orientation of the transverse cutting plane may follow the orientation of the patient anatomy.

Figure 5E:
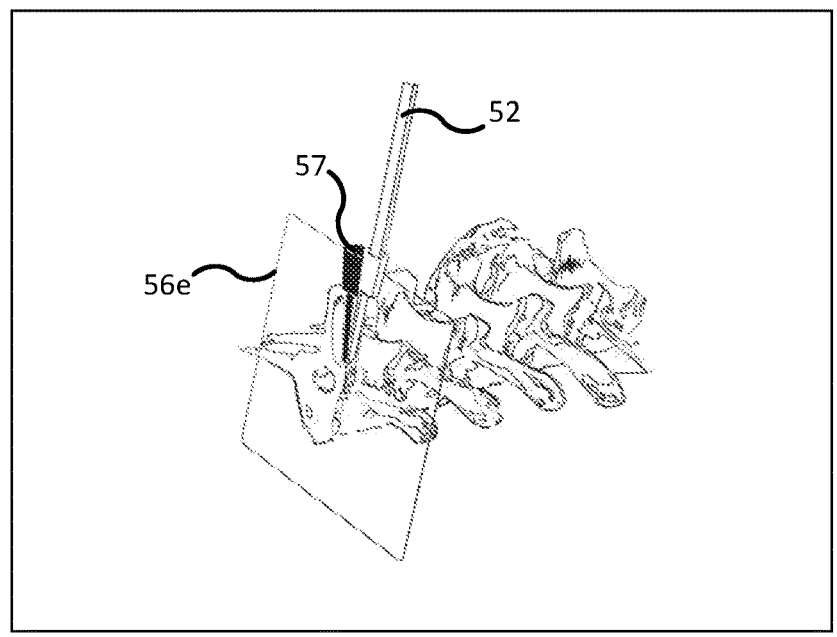

FIG. 5e illustrates an embodiment wherein at least one display plane 56e is fixed relative at least one dimension of the virtual representation of the surgical instrument 52. In the illustrated embodiment, it is fixed relative the longitudinal axis, i.e. the insertion direction of the surgical instrument. Hence, as the virtual representation of the surgical instrument 52 rotates, the virtual representation of the pre-operative plan is updated, such as a transverse representation of the pre-operative plan, as is illustrated in FIG. 5e. In the illustrated embodiment, only an object representation is generated. In other embodiments, grey value data is presented at the transverse cross-section of the anatomical structure, e.g. such that grey value data is generated in the window in the transverse plane. This embodiment may be combined with any of the other embodiments of the split window 50, such as generated in a part 56a-56d of the split window.

In still other embodiments the orientation of at least one display plane is fixed relative the orientation of scan data of the pre-operative plan, such as the orientation of volumetric data, e.g. CT slices of DICOM files.

In some embodiments, enabling and/or disabling the display planes 56a-56d is initiated from an actuator, such as a push button, of the tracker 2a-2e. Hence, the surgeon can operate the system without interacting with a computer running the surgical navigation system. Furthermore, any of the parts 51a-51d of the split window 50 may be enabled or disabled depending on a particular step of the surgical procedure, such as insertion of the particular implant component, such as a cup or stem of a hip replacement procedure. The step of the procedure may be indicated in a graphical user interface or depending on an identified attachment component.

The method and system for associating the pre-operative plan may be used together with the navigation system presented herein. Hence identity data may be received from at least one tracker 2a-2e of the navigation system, wherein the tracker identity data is unique for each tracker 2a-2e in the navigation system. Position and orientation data of a tracker interface attached to the tracker interface of an attachment component is received. Calibration data defining the position and orientation of a portion of the surgical instrument relative a tracker interface of the attachment component is obtained. The position and orientation data of the tracker interface is translated into position and orientation data of the instrument using the identity data and said calibration data before generating the virtual representations of the surgical instrument relative the virtual representation of the patient anatomy. In other embodiments, the method and system for associating the pre-operative plan may be used with other navigation systems wherein the position and orientation of a surgical instrument is tracked. However, common to these systems is that the virtual representation of the surgical instrument 52 relative the pre-operative plan corresponds to the position and orientation of the surgical instrument relative patient during the operation one the patient anatomy is referenced. Hence, the virtual representations of the surgical instrument relative multiple virtual representations of the pre-operative plan are dependent on the tracking data, which provides the position and orientation of the surgical instrument.

The system for associating a pre-operative plan with position and orientation of a surgical instrument in a surgical navigation system comprises a surgical navigation module, such as the surgical navigation system 40. The system may be configured to generate a preoperative plan with a virtual representation of patient anatomy and a planned position and orientation of a surgical object. The navigation system 41 comprises at least one tracker attachable to an instrument to be tracked, and a localizer for tracking at least one of position and orientation of said at least one tracker, such as is disclosed in embodiments herein. The at least one tracker may comprise the position transmitter and the tracker interface for attaching the at least one tracker to the instrument. The navigation system 41 may be arranged to report tracking data comprising position and orientation of the tracker to the surgical navigation module. The surgical navigation module may be configured to generate tracked position and orientation of the surgical instrument as virtual representations of the surgical instrument relative virtual representations of pre-operative plan in separate parts of a split window depending on the tracking data. The surgical navigation module may comprise the display 4 and the computer 5 comprising a processor and memory for running software instructions for implementing the method for associating the pre-operative plan with position and orientation of the surgical instrument in the surgical navigation system 40.

FIGS. 6a-6d illustrates embodiments of a method for determining at least one of position and orientation of the instrument using the navigation system 41 including at least a first and a second tracker 102e, 102b. The method may be implemented e.g. by a computer, such as computer 5. Position and orientation data of the first tracker 102e, which is attached to a calibration station 101 in a known fixed position and orientation relative a calibration location of the calibration station 101, may be generated. Position and orientation data identifying position and orientation of the tracker interface of the second tracker 102b may be obtained while the second tracker 102b is removably attached to the instrument using the tracker interface of the second tracker 102b. The position and orientation of the instrument relative the second tracker may be determined using the position and orientation data of the first tracker 102e, the position and orientation data of the tracker interface of the second tracker 102b, and the known fixed position and orientation of the calibration location relative the position and orientation of the first tracker 102e.

The position and orientation data of the first tracker 102e may comprise position and orientation of a tracker interface of the first tracker 102e obtained while the tracker interface of the first tracker 102e is attached to the tracker interface of the calibration station 101. In other embodiments, the calibration station 101 has an integrated tracker. However, having a tracker interface makes the calibration station independent in the navigation system, which makes it more flexible and the navigation system exchangeable and possible to upgrade to new navigation technology without replacing the calibration station.

The position and orientation data of the second tracker 102b may be received while the second tracker 102b is attached to the tracker interface of the attachment component, which in turn is attached to the instrument. Utilizing an attachment component for attaching the tracker makes the system flexible, and the tracker may be retrofitted to any instrument. Hence, the surgeon may continue to use the instrument with which he is familiar while benefiting of enhanced information via the navigation system.

Tracker identity data for at least the second tracker 102b, which uniquely identifies the second 102b tracker in the navigation system 41 may be received while obtaining the position and orientation data of the tracker interface of the second tracker 102b, as will also be further discussed below. Also, the determined position and orientation of the instrument relative the second tracker may be stored in a database together with the tracker identity data of the second tracker 102b, and preferably with instrument data identifying a specific combination of an instrument and attachment component. Hence, it is not necessary to calibrate the specific combination of an instrument and attachment component every time the tracker is attached to the combination. Rather the combination may be identified in the surgical navigation system 40 and associated with a particular tracker. The identification may be made by an operator of the system. Re-calibration is only necessary if the attachment component has been detached from the instrument from a previous calibration.

A system may be used for calibrating the position and orientation of the instrument within the navigation system. As discussed above, a first tracker 101e is attachable to the calibration station 101 and the second tracker 101b attachable to the attachment component. The calibration station 101 has a calibration location for receiving a portion of the instrument. At least one attachment component is provided for attaching the second tracker 102b to the instrument. At least the second tracker 102b comprises the tracker interface for attaching the second tracker 102b to a tracker interface of the attachment component.

The first tracker 102e may comprise a tracker interface for attaching the first tracker 102e to a tracker interface of the calibration station 101. The tracker interface of the calibration station 101 has a fixed position and orientation relative the calibration location.

The tracker interface of the attachment component may be identical to the tracker interface of the calibration station. This makes the system accurate and reliable. If the tracker interfaces comprises an anti-rotational feature, the tracker cannot be accidentally rotated. However, in other embodiments the tracker interface of the calibration station 101 comprises an anti-rotational feature, and the second tracker 102b is rotationally attachable relative the tracker interface of the attachment component. Hence, it is easier to orient the tracker 102b relative the instrument such that it is in a suitable orientation relative the localizer during surgery.

FIGS. 6a-6d illustrates embodiments of the calibration station 101 having a tracker interface 124 identical to the tracker interface 44 of the attachment components, as discussed above. Hence, a tracker 102e is attachable to the calibration station in a fixed position and orientation relative the calibration station.

FIGS. 6a-6d also illustrates embodiments of the method for determining at least one of position and orientation of the instrument, such as determining the position of a particular attachment component 110 and instrument 103b combination. The method may be implemented by the CAD module 42 to transform position and orientation of a tracker to position and orientation of at least a portion of the instrument 103b. The calibration station 101 is associated with a known calibration location 108 for an end effector of a surgical instrument, such as a tip of the surgical instrument, a plane of the surgical instrument, a center of rotation of the instrument, and/or a combination thereof. The tracker interface 124 of the calibration station 101 has a fixed predetermined position and orientation relative the calibration location 108. The position and orientation of the calibration location relative the position and orientation of the tracker interface 124 of the calibration station 101 is known to the surgical navigation system 30, such as to the CAD module 42. The tracker interface 124 of the calibration station 101 may be defined as the origin for the calibration, relative which other components positions and orientations are reported.

Calibrating the position and orientation of the instrument 103b may be made using two trackers 102b, 102c. Each tracker 102b, 102c comprises a tracker interface, as has been discussed above. Hence, each tracker 102b, 102c comprises a trackable surface within the navigation system 41. The instrument interface of the attachment component 110 is attachable to the surgical instrument 103b. A first tracker 102e is attachable to the tracker interface 124 of the calibration station 101. A second tracker 102b is attachable to the tracker interface of the attachment component 110.

FIG. 6a illustrates the system uncalibrated, wherein the first and second trackers 102e, 102b are in a first coordinate system $x_1$, $y_1$, $z_1$ known to the navigation system; the calibration station is in a second coordinate system $x_2$, $y_2$, $z_2$; and the surgical instrument is in a third coordinate system $x_3$, $y_3$, $z_3$. The position and orientation of the first tracker 102e or the second tracker 102b may be defined as origin for the calibration. The following embodiments are described with regard to the first tracker 102e, i.e. its tracker interface, as providing the origin. However, the second tracker 102b may be defined as origin for the calibration in other embodiments. Since the origin is predefined, the navigation system only needs to report the position and orientation of the tracker interface of the second tracker 102b relative origin. Identifying the position and orientation of the first tracker 102e identifies the origin. The position and orientation of the first tracker attached to a calibration station in a known fixed position and orientation relative the calibration location 108 of the calibration station 101 does not have to be reported to the CAD module, which may set this value to a default value. The relative position and orientation between the first tracker 1020e and the relative position and orientation between the first tracker, i.e. the origin for calibration, and the tracker interface of the second tracker 102b may be obtained from the navigation system. Data of the relative position and orientation may be obtained in the CAD module. The position and orientation of the instrument is determined using the relative position and orientation between the first tracker, i.e. origin, and the tracker interface of the second tracker 102b, and the known fixed position and orientation of the calibration location relative the position and orientation of the first tracker, i.e. relative origin. These may be calculated based on the values of the known origin, the known position and orientation of the calibration location relative the position and orientation of the first tracker, i.e. relative origin, and the obtained relative position and orientation between the first tracker, i.e. origin, and the tracker interface of the second tracker 102b.

Returning to FIG. 6a, the first, second and third coordinate systems are uncalibrated. The first coordinate system is the coordinate system of the navigation system. In a first step illustrated in FIGS. 6a-6b, the second coordinate system $x_2$, $y_2$, $z_2$ is aligned or coordinated with the first coordinate system $x_1$, $y_1$, $z_1$ by attaching the first tracker 102e to the tracker interface of the calibration station 101. This identifies the origin for the calibration, wherein the position of the tracker interface 124 of the calibration station 101 is known in the coordinate system $x_1$, $y_1$, $z_1$ of the navigation system 30, as is illustrated in FIG. 6b. The tracker interface 124 of the calibration station 101 is now located at the origin for the calibration, identified by the first tracker 102e. Also, the third coordinate system $x_3$, $y_3$, $z_3$ is aligned or coordinated with the first coordinate system $x_1$, $y_1$, $z_1$ by attaching the second tracker 102b to the tracker interface of the attachment component 110 having its instrument interface attached relative the surgical instrument 103b. In some embodiments, the instrument interface is fixed to the instrument in two dimensions, such as the x and z dimensions, and has a predetermined stop position in the third dimension, such as the y dimension. Such predetermined stop position may be a stop member of the instrument and/or instrument interface such that the attachment component cannot move any further in one direction along the third dimension. For example, the attachment component may be attached to a rotatable shaft, such as the shaft of a reamer or planar, such that it may move along the shaft but not be tilted relative the shaft. Calibration occurs when the attachment component is at the stop member, such that the surgeon always can return to the calibrated position of the attachment component relative the instrument. Attaching the attachment component 110 to the surgical instrument 103b is not illustrated. Hence, the position and orientation of the tracker interface of the attachment component 110 is known in the coordinate system $x_1$, $y_1$, $z_1$ of the navigation system 30, as is illustrated in FIG. 6b. However, the position and orientation of the end-effector of the surgical instrument in the coordinate system $x_1$, $y_1$, $z_1$ of the navigation system 30, i.e. relative origin, is still unknown.

FIGS. 6c-6d illustrates coordinating or registering the position and orientation of the surgical instrument 103b in the coordinate system $x_1$, $y_1$, $z_1$ of the navigation system 30. This is done by positioning the end effector of the instrument 103b at the calibration location 108. The end effector may be the portion of the instrument that is to be tracked in the CAD module 42. The end effector may be a surface of the instrument, such as a surface of a reamer, a tip of a drill or other instrument etc. It may also be a center of rotation of an instrument, such as the center of a reamer or a planar. In the illustrated embodiment, the end effector is the center of rotation of a reamer. As is illustrated in FIG. 6c, the end effector of the instrument is positioned at the calibration location 108. Next, the position and orientation of the second tracker 102b relative the position and orientation of the first tracker 102e, such as the position and orientation of their tracker interfaces, are registered by the navigation system. In some embodiments, only the position and orientation of the tracker interface of the second tracker 102b relative the position and orientation of the tracker interface of the first tracker 102e is reported. This is sufficient when the origin for calibration is predefined as the location of the tracker interface of the first tracker 102e. The position and orientation of the tracker interface of the second tracker 102b may be obtained by the CAD module 42 from the navigation system. In other embodiments, the positions and orientations of the tracker interface of the first as well as of the second tracker are obtained.

Since the position and orientation of the calibration location 108 relative the first tracker 102e, i.e. relative the calibration origin, is known, the position and orientation of the second tracker 102b relative the end-effector of the surgical instrument 103b can be determined and stored, such as in a transformation table or database. This may also be stored together with tracker identity and instrument identity, for example if multiple tools are used at the same time, or if the tracker is connected to different instruments during various steps of the surgical procedure. Hence, the coordinate systems are coordinated, and the position and orientation of the end-effector of the surgical instrument 103b may be continuously determined by tracking and translating the position and orientation of the second tracker 102b, i.e. the position and orientation of the tracker interface thereof.

The calibration method may be used for any instrument and any replacement system. The system may be used with only two trackers in order to track position and orientation of any instrument. Hence, the system is extremely flexible and may easily be adapted to new replacement systems. Furthermore, an intermediate attachment interface that has a predefined shape means that the surgical navigation system 31 can be replaced by new navigation technology. The navigation system simply needs to report the position of the tracker interface relative an origin of the system, such as for calibration.

As discussed above, to calibrate the position and orientation of the surgical instrument 103b in the first coordinate system, the end-effector is positioned at the calibration location 108. The calibration location may be a recess or a protrusion in or at a surface of the calibration station 101, such that it has a substantially fixed position at one point and/or in one plane, e.g. the $x_1$-$z_1$ plane, illustrated in FIGS. 6c-6d.

In some embodiments, the position of the tracker interface of the second tracker 102b may be registered while moving the surgical instrument, and thus the attachment component and the second tracker 102b attached thereto. The attached components may be moved in at least a second plane, such as the $x_1$-$y_1$ plane and/or $y_1$-$z_1$ plane, and while the end-effector is positioned at the calibration location 108, i.e. has a relatively fixed position in one point or one plane, such as the $x_1$-$z_1$ plane. Multiple positions and orientations of the tracker interface of the second tracker 102b are registered while moving in the second plane. At the same time, the position and orientation of the first tracker 102e is registered. Based on these registered positions and orientations, the position and orientation of the center of rotation of the second tracker 102b, and thus the center of rotation of the end-effector, may be calculated. Also, the position and orientation of the axis of the surgical instrument 103b relative the tracker interface of the second tracker 102b may be calculated.

In FIG. 6d, the surgical object 93 is shown in a single position for illustrative purposes. As an alternative calibration method, the surgical instrument may be positioned perpendicularly to a calibration plane of the calibration station 101 while the position and orientation of the tracker interface of the second tracker 102b is registered. The calibration plane has a fixed orientation relative the tracker interface of the calibration station 101, i.e. relative calibration origin. Hence, the position and orientation of the axis of the surgical instrument 103b within the first coordinate system may be calculated using the calibration plane and calibration location 108. The calibration plane may be the top surface 109 of the calibration station, as is illustrated in FIG. 6d. The instrument may be attached to a calibration support that has a shape that is complementary to the shape of surfaces at the calibration location, such as part-spherical component with legs extending along the calibration plane and that supports the instrument during calibration and keeps it stable in the plane. Three such legs may be sufficient for fixed angular relationship between the longitudinal axis of the instrument and the calibration plane during the calibration process.

The navigation system may comprise at least one tracker attachable to an instrument to be tracked and a localizer for tracking at least one of position and orientation of said at least one tracker. The at least one tracker may comprise a position transmitter and a tracker interface for attaching the at least one tracker to the instrument, as has been discussed above. Position and orientation of position transmitter may be used by the navigation system to obtain position and orientation of the tracker interface of the tracker. The positional and orientation relationship between the position transmitter and the tracker interface is predetermined and known to the navigation system, which may be configured to report the position and orientation of the tracker within the navigation system.

Embodiments comprise a method for tracking position and orientation of the instrument using the navigation system 41. The method may be implemented in the surgical navigation system 41, such as a by a computer running the CAD module 42. As is discussed above, the navigation system may include a plurality of trackers 2a-2e and a localizer for identifying the position and orientation of the tracker. Each tracker may have a unique identity in the navigation system, such as an identification no. The tracker identity data is unique for each tracker in the navigation system. Identity data, such as the identification no. may be reported by the tracker 2a-2e, such as using a wireless transmitter, e.g. using wireless radio technology, such as WiFi or Bluetooth technology. The identity is reported to the navigation system. Furthermore, the position and orientation of the tracker interface of the tracker 2a-2e for with identity no. has been received may be determined by the navigation system. Sending the identity data from the tracker may be triggered, such as initiated by a user activating an actuator. The navigation system may determine the position and orientation of the tracker upon receiving the identity data. According to the method, identity data from at least one tracker of the navigation system is received. Also, position and orientation data of the tracker interface being attached to the tracker interface of the attachment component is obtained. The identity data and the related position an orientation data of the reporting tracker may be used to translate the position and orientation data of the tracker interface of the reporting tracker into position and orientation data of the instrument. The identity data may be used to query a database to obtaining calibration data defining the position and orientation of a portion of the instrument, such as discussed above. Then, the position and orientation of the instrument may be determined based on the calibration data. The calibration data may be obtained as discussed above. Similarly, the method may comprise attaching the tracker to the attachment component, and the attachment component to the instrument, as has been discussed above.

Figure 7:
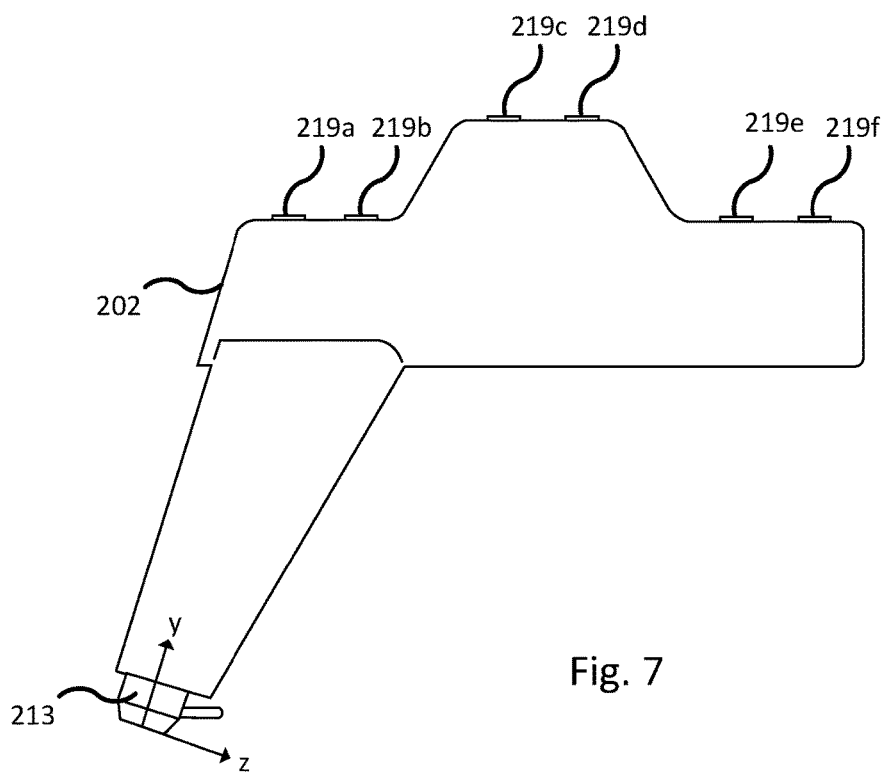
FIG. 7 is a side view of a tracker attachable to an attachment component.
Figure 8A:
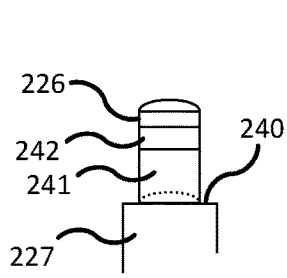
FIGS. 8a-8c are side and perspective views, respectively, of a tracker interface of an attachment component.
Figure 8B:
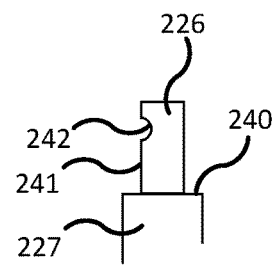
Figure 8C:
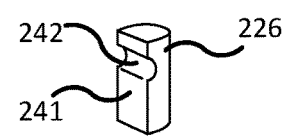

FIG. 7 illustrates an embodiment of a tracker 202 according to embodiments of the invention. The tracker 202 has a position transmitter arranged in a fixed and predetermined position relative the tracker interface 213. The position transmitter may comprise as a plurality of active and/or passive markers arranged in a predetermined relationship and/or having predetermined shapes. In this embodiment, the position transmitter comprises an active position transmitter, which comprises a plurality of LEDs 219a-219f arranged in a known pattern relative the tracker interface 213 of the tracker 202. The markers have a known position and orientation relative the origin of the coordinate system of the tracker 202, which is located at its tracker interface 213 according to embodiments described herein. The localizer may in this embodiment comprise a camera to capture the position of the position transmitter, such as light transmitted by the LEDs 219a-219f, which a processor thereof may utilize to determine the position and orientation of the of the tracker interface 213. Transmission of position information may be triggered by actuators integrated in the housing of the tracker (not illustrated). A system for obtaining the position based on active markers is e.g. disclosed in WO91/16598, which is incorporated herein by reference for all purposes. Another example is disclosed in disclosed in U.S. Pat. No. 5,440,392, which is incorporated herein by reference for all purposes. Another embodiment of an optical navigation system is disclosed in U.S. Pat. No. 6,166,809, which is incorporated herein by reference for all purposes, with which both position and orientation may be obtained. Embodiments of the present invention may also be used with inertial navigation systems, wherein sensors such as accelerometers and gyros are arranged in a known position and orientation relative the tracker interface 213 of the tracker 202. As is illustrated in FIG. 7 and according to embodiments of the present invention, the coordinate system is located at the tracker interface 213, e.g. such that the y axis is extending along the longitudinal axis of the tracker interface 213, and is located at the center of the tracker interface 213. The x and z axes are extending parallel to a plane formed by the tip or free end of the tracker interface 213. The markers have a known position and orientation relative the origin of the coordinate system of the tracker 202, which is located at its tracker interface 213. This means anything can be aligned and tracked relative the tracker interface 213.

FIGS. 8a-8c, and 11a-11b illustrate front, side, and perspective views, respectively, of an embodiment of the tracker interface of the attachment component. As discussed above, the tracker interface of the attachment component may comprise a protrusion 226 extending from a base 227. The base 227 has a larger cross-sectional diameter than the protrusion 226 as measured perpendicularly relative the longitudinal axis of the tracker interface. This means that the base 227 has a top surface 240 (not illustrated in FIG. 8c) facing the towards the tracker interface of the tracker. The protrusion 226 is in this embodiment semi-circular with a radially facing non-circular surface 241. The non-circular surface 241 may be a generally flat or planar surface extending in a plane that is perpendicular to the top surface 240 of the base 227. Furthermore, the tracker interface comprises a locking feature 242, for locking engagement of the tracker interface to a tracked surface of the tracker, such as the tip of the tracker interface 213 of the tracker 202. In this embodiment, the locking feature 242 is a semi-circular recess provided in the non-circular surface 241. The locking feature 242 may extend perpendicularly relative the longitudinal axis of the tracker interface and parallel to the top surface 240 of the base 227. In this embodiment, the locking feature 242 only extends partially around the circumference of the protrusion 226. In other embodiments, the locking feature 242 extends around the entire circumference of the protrusion 226, which may improve stability and thus accuracy of tracking of the attachment component.

Figure 9A:
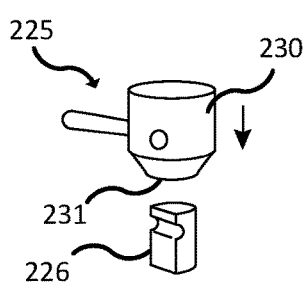
FIGS. 9a-9c are side and perspective views, respectively, of a tracker interface of a tracker in non-aligned, non-locked, and locked positions, respectively, relative a tracker interface of an attachment component.
Figure 9B:
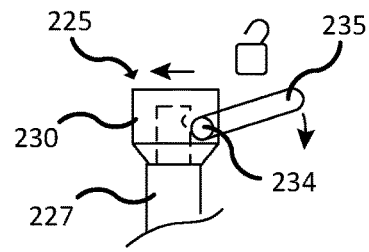
Figure 9C:
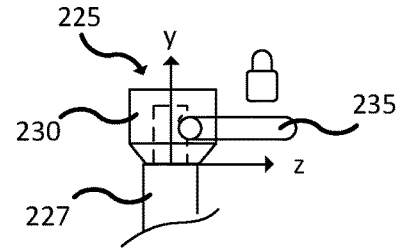

FIGS. 9a-9c illustrate attaching the tracker interface 225 of the tracker to the tracker interface of the attachment component. In this embodiment, the tracker interface 225 of the tracker comprises a chuck. The chuck comprises a boss 230 with a generally flat or planar end surface 231, which may be part of or form the tip of the tracker, and a recess (not illustrated). The end surface 231 extends perpendicularly relative the longitudinal axis of the recess of the tracker interface 225. Furthermore, the chuck comprises a locking element that comprises an eccentric rod 234 connected to a level arm or actuator 235. The eccentric rod 234 is arranged perpendicularly relative the longitudinal axis of the recess of the tracker interface 225. The level arm is arranged to swivel the eccentric rod 234, which is rotatably arranged in the tracker interface 225 of the tracker.

As is illustrated in FIG. 9a, the tracker interface 225, i.e. the recess, of the tracker 202 is configured to fit over the protrusion 226 of the tracker interface of the attachment component. The recess and protrusion may fit in a location fit. The semi-circular surface of the protrusion 226 has a shape that substantially corresponds to a shape of an inner radially facing surface extending in the longitudinal direction of the tracker interface 225 of the tracker. The semicircular surfaces are arranged and sized to abut each other, at least in a locked position of the tracker interfaces.

As is illustrated in FIG. 9b, when the tracker interface 225 of the tracker is fully seated, it fits over the protrusion 226 of the tracker interface of the attachment component, as is illustrated with phantom lines. Also, the end surface 231 of the tracker interface 225 of the tracker may abut the top surface 240 of the tracker interface of the attachment component. Also the locking feature 242 faces the locking element. Before being locked, the locking element is positioned such that the maximum distance between the eccentric rod and the semi-circular surface of the recess is slightly larger than the maximum diameter of the protrusion 226 measured at the longitudinal axis of the non-circular surface 241 perpendicularly to the semi-circular surface of the protrusion 226. In this position, the tracker interface 225 of the tracker is aligned with the tracker interface of the attachment component, as is illustrated with the unlocked pad lock symbol.

As is illustrated with a locked pad lock symbol in FIG. 9c, the tracker interfaces may be locked to each other when the lever arm 235 is pushed or swivel to a locked position, such that the eccentric rod 234 is positioned within the locking feature 242. Hence, the locking element is positioned such that the maximum distance between the eccentric rod and the semi-circular surface of the recess is smaller than the maximum diameter of the protrusion 226 measured at the longitudinal axis of the non-circular surface 241 perpendicularly to the semi-circular surface of the protrusion 226. Furthermore, the tracker interface of the tracker may be pushed towards the tracker interface of the attachment component in the locked position, such as by the eccentric rod 234 engaging the locking feature 242. This may e.g. be provided by the eccentric rod engaging at least a portion of the semi-circular recess provided in the non-circular surface 241, such as at an upper or lower surface thereof. Hence, the tracker interfaces are locked in a position such that the tracked surface of the tracker abuts a tracked surface of the attachment component. Thereby the tracker interfaces share a common origin, as is illustrated with the y/z axes (x axis extending into the plane of FIG. 9c). Hence, tracking position and orientation of the tracker interface of the tracker also tracks the attachment component when locked to each other.

Furthermore, the tracker interface 213 of the tracker 202 is a calibrated tracker interface, wherein its exact position and orientation in the navigation system is predefined and known and does not need to be calibrated. The position and orientation within the navigation system may be pre-calibrated during manufacturing, such as against a master calibration tool, e.g. including an interface corresponding to the tracker interface of the attachment component, which is mounted in a fixed relationship relative calibration markers. Reading the position and orientation of the position transmitter relative the coordinate system of the master tool calibration markers may pre-calibrate or characterize the tracker interface of the tracker to the master tool. This may be done prior to delivery of the navigation system.

The calibration station 101 described with regard to FIGS. 6a-6d is a calibration object that may be stationary, i.e. it is not attached to the instrument. As such, the calibration object may have a platform, which is configured to be positioned stably on a surface during the calibration procedure, e.g. such that the instrument can be positioned at a predefined position relative the calibration location. This provides for a simple and stable positioning of the instrument relative the calibration station. The instrument does not need to be fastened to the stationary calibration station during the calibration procedure. However, the navigation system may only include a single position tracker 6, such as a single camera or a receiver of accelerometer and gyro data from the trackers. For example, the calibration may be done shortly before a surgery commences in order to assure accuracy of the system. That means that the position tracker 6 is arranged such that the patient will be located within the operational range of the position tracker 6, which may cover a portion of the operating table and a relatively small volume surrounding the operating table. During calibration, the trackers also need to be within the operational range of the position tracker 6. This has the consequence that it may in certain situations and/or for certain navigation systems be inconvenient or impractical to arrange the calibration station 101 in the operational range of the position tracker 6, which is arranged in an optimal position for surgery but not necessarily for calibration. This may e.g. be the case for optical navigation systems, but not for inertial navigations systems, which are not limited by a field of view of a camera.

Figure 10A:
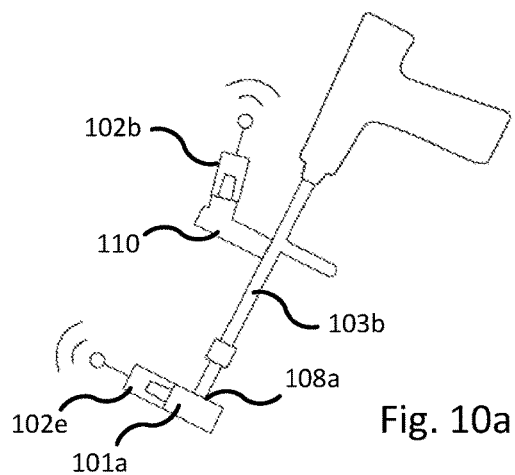
FIGS. 10a-10e are side-views of embodiments of calibration objects attached to surgical instruments.
Figure 10B:
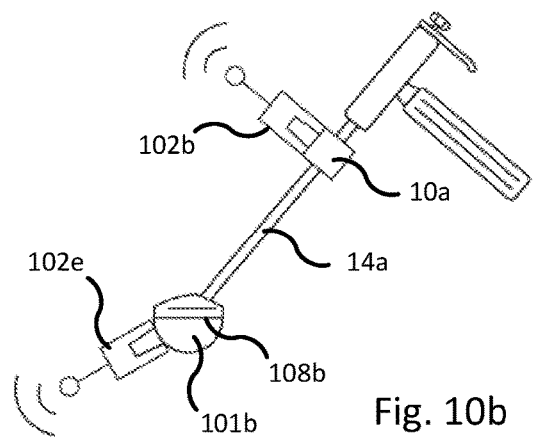

FIGS. 10a-10e and 11a-11c disclose embodiments of calibration objects 101a, 101b, 101c, 101d that are mobile calibration stations, as is envisaged within the scope of the calibration station as discussed with regard to FIG. 4, i.e. for calibrating location, such as position and/or orientation of the instrument 103b, 14a within a navigation system. The mobile calibration station 101a-101d may comprise elements as disclosed with regard to FIGS. 6a-6d, and the same features are denoted with the same reference numerals. Hence, the mobile calibration object 101a-101d can be used for calibrating location of any of the instruments 103b illustrated in FIG. 6a-6d, which may comprise a at least a portion of a reamer instrument, e.g. a reamer shaft as illustrated in FIGS. 10a, and 10c-10e, and the instrument 14a, which may comprise a cup inserter, as illustrated in FIG. 10b. The instruments illustrated in FIGS. 10a-10e and 11a-11c are only examples, other examples as disclosed herein as well as other instruments or portions thereof may be subject of the embodiments disclosed herein for calibrating their location within the navigation system, such as an instrument positioning a stem of a hip implant.

As the previous embodiments discussed above, the embodiments of FIGS. 10a-10e and 11a-11c may be used together with a first tracker 102e, and a second tracker 102b. The embodiments of the tracker interface for attaching a tracker 102e of the navigation system to the mobile calibration objects 101a-101d may correspond to the tracker interface 124 discussed above, such as with regard to FIGS. 6a-6d and will not be discussed again with regard to FIGS. 10a-10e and 11a-11c except with regard to alternative embodiments. Similarly, the attachment components 10a-10d and 110 discussed above may equally be used together with the embodiments of FIGS. 10a-10e and 11a-11c and will not be discussed again with regard to FIGS. 10a-10e and 11a-11c except with regard to alternative embodiments.

Figure 10C:
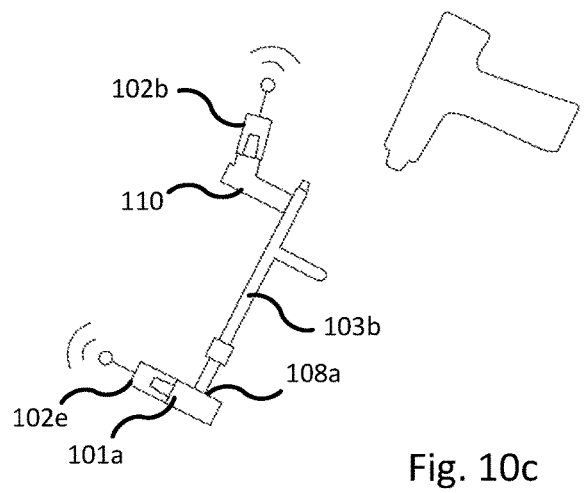
Figure 10D:
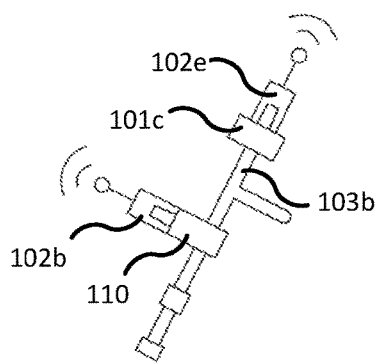
Figure 10E:
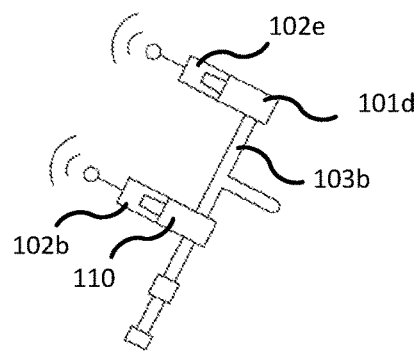
Figure 11A:
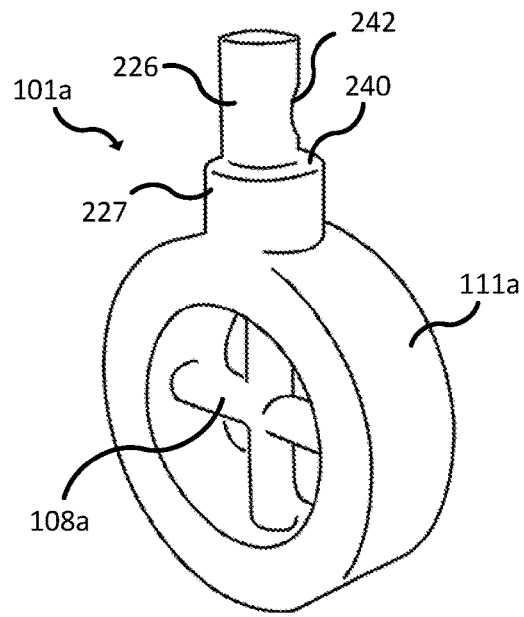
FIGS. 11a-11c are perspective views of embodiments of calibration objects.
Figure 11B:
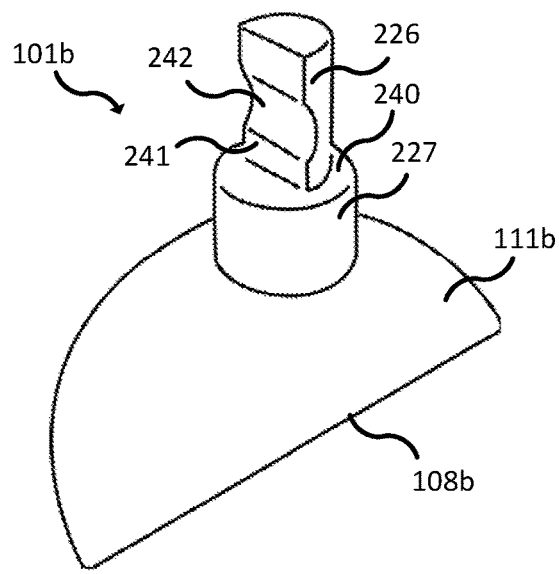
Figure 11C:
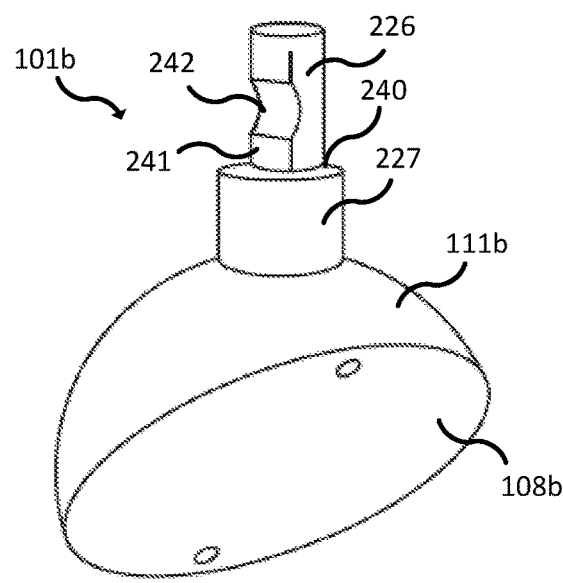

FIGS. 10a-10e and 11a-11c illustrate embodiments of calibration objects 101a-101d that may be mobile. As is illustrated in FIGS. 11a-11c, the calibration object 101a, 101b comprises a calibration body 111a, 111b having a calibration location 108a, 108b for receiving a portion of the instrument 013b in a predefined position, in the same way as the embodiments of FIGS. 6a-6d. The tracker interface has a predetermined location relative the calibration location 108a, 108b. The tracker interface may comprise the protrusion 226 extending from the base 227, the top surface 240, the radially facing non-circular surface 241, and/or the locking feature 242, which may be a semi-circular recess provided in the non-circular surface 241, as has been discussed above. Furthermore, the tracker interface of the calibration object 101a-101d may comprise the origin for the calibration. The origin may have a predetermined location, such as fixed position and orientation, relative the calibration location 108a, 108b.

As is illustrated in FIG. 11a, the embodiments of FIG. 10a-10d, 11a-11b, as well as the embodiments of FIGS. 6a-6d, the calibration location 108a, 108b may comprise an instrument attachment member configured for releasable fastening of the calibration object 101a-101d to an instrument, such as in a predetermined position and/or orientation. Hence, the calibration body 111a, 111b may be releasably fastened in the rotational and/or axial direction relative the instrument 14a, 103a. Hence, the tracker 102b, when attached to the calibration object 101a-101d, is also fixed in the rotational and/or axial direction relative the instrument 14a, 103a. Surgical instruments, such as instrument 14a, 103a, may have an attachment interface in order to switch between different sizes of end effectors and/or for releasable fastening of an implant. The instrument attachment member may be configured for releasable attachment to the attachment interface of any such surgical instrument. For example, the instrument attachment member of the embodiment of FIG. 11a comprises pins forming a cross, that hooks of the instrument attachment interface may engage. The size of the pins corresponds to the size of the hooks. The pins may be formed in the center of a ring shaped body, which comprises the tracker interface attached on its surface projecting outwardly relative the center. The pins provide for axial and rotational attachment of the instrument to the calibration location 108a, 108b. Similarly, the embodiment of FIG. 11b-11c comprises a surface with at least one recesses and/or protrusion forming the instrument attachment member. The embodiment of FIG. 11c comprises two recesses. Each recess may comprise a snap fit attachment interface, e.g. comprising protrusions extending in the radial direction of the recess. Such a snap fit attachment interface may be fixed in the axial direction, but may not necessarily be fixed in the rotation direction, such as if a position of the tool is to be guided but not an orientation of the tool. The recess of the surface may alternatively or additionally comprise a press-fit and/or friction fit connection. Hence, the calibration object 101a-101d, such as its instrument attachment member, may comprise at least one surface that has a shape that is complementary to a shape of a surface of the instrument attachment interface.

In the embodiment of FIG. 11a, the calibration body 111 comprises a circular member, such as ring shaped member, with the instrument attachment member in the center. Such a calibration body may be useful for a tool such as a reamer.

In the embodiment of FIGS. 11b-11c, the calibration body 111 comprises a part-spherical member, such as half-spherical, with the attachment member at a substantially flat surface of the part-spherical member. Such a calibration body may be useful for a tool such as a cup inserter.

Returning to FIGS. 10a-10e, the calibration object 101a-101d provides for a more flexible calibration method. The calibration object 101a-101d may be temporarily fixedly attached or fastened to the surgical instrument 14a, 103a, and the trackers 102a, 102e attached to their respective tracker interfaces. Then, the operator can grab the instrument 14a, 103a with a single hand, move the entire unit including the attachment component 110, the calibration object 101a-101d, and the trackers 102a, 102e, and hold the unit within the operational range of the position tracker 6. Hence, the operator can prepare the instrument 14a, 103a for calibration at one location, and than only be within the operational range of the position tracker 6 for a short period of time. Furthermore, this means that one operator may prepare the navigation system for surgery while another operator prepares the instrument(s) for calibration. Calibration may conveniently be carried out also when the position tracker 6 is positioned for surgery relative an operating table. Hence, the calibration process as well as the entire navigation system is more flexible, which is useful for any navigation system, but particularly for navigation systems with more limited operational range, such as optical navigation systems.

As is illustrated in FIG. 10a, the system may be calibrated with the surgical tool, such as a drilling machine, attached to the surgical instrument 103b. Alternatively, the system may be calibrated with the surgical tool detached from the surgical instrument, such as illustrated in FIG. 10c.

FIGS. 10d-10e illustrate embodiments wherein the calibration object 101c, 101d is attached to a tool-engaging end of the instrument 103b, such as for engaging a chuck of a surgical tool, e.g. a chuck of a drilling machine. The tool-engaging end of the instrument 103b may have an antirational engagement member for antirational engagement with the surgical tool. The calibration object 101c, 101b may be configured with complementary surfaces corresponding to the chuck of the surgical tool, such that the calibration object 101c, 101d may be attached at a predetermined location relative an end-effector end of the instrument 103b. Hence, the location of the calibration object 101c, 101d, when temporarily attached to the tool-engaging end of the instrument 102b, relative the location of the end-effector end is predetermined and known. Knowing the shape of the end-effector, the relative position relative to the end-effector, when attached to the end-effector end, may also predetermined and known. This information may be stored in a database.

The calibration object 101c, 101d may have a body that comprises the tracker interface for attachment to the tracker and an instrument attachment interface for engagement to the tool-engaging end of the instrument 103b. The instrument attachment interface has a fixed predetermined location relative the end-effector end of the instrument 103b. Hence, by calibrating against the tool-engaging end, the location of the end-effector end of the instrument 103b may be determined and tracked using the tracker 102b attached to the attachment components 10a-10d and 110 as discussed above.

As is illustrated in FIGS. 10d, 10e, the tracker interface of the calibration body 101c, 101d can be arranged at an arbitrary position relative the instrument 103b. In the embodiment of FIG. 10d, the tracker interface is arranged parallel to the longitudinal axis of the instrument 103b. In the embodiment of FIG. 10e, the tracker interface is arranged non-parallel to the longitudinal axis of the instrument 103b, such as substantially perpendicular to the longitudinal axis of the instrument 103b. Hence, the orientation of the tracker interfaces relative the instrument 103b may be optimized for visibility to the position tracker 6, wherein the calibration process is optimized.

The calibration object 101a, 101b may comprise the body 111a, 111b, which may comprises at least one of the calibration location 108a, 108b and the tracker interface. The calibration location 108a, 108b may be integrally formed with the body. Additionally or alternatively, the tracker interface of the calibration body may be integrally formed with the calibration body 111a, 111b. Hence, the calibration location 108a, 108b and/or the tracker interface of the calibration object 101a, 101b, as well as the calibration body 111a, 111b, may be formed as a single unit, such as in a single material. Alternatively, the tracker interface is detachably attached to the calibration body at a predetermined location relative the calibration location 108a, 108b in the same way as the tracker interface 13d relative the body 11d of FIG. 2e. Hence, the tracker interface may be detachably attached to the calibration body 111a, 111b at a predetermined location relative the calibration location 108a, 108b.

As described above, the system for calibrating position and orientation of an instrument within a navigation system may comprise a calibration object, such as a stationary and/or mobile calibration body, wherein the tracker interface of the calibration object is a first tracker interface, the attachment component comprises a tracker interface, which is a second tracker interface. The navigation system comprises the first tracker 102e attachable to the first tracker interface and a second tracker 102b attachable to the second tracker interface. The first tracker interface and the second tracker interface may be identical.

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. The processes and systems described herein may be performed on or encompass various types of hardware, such as computer systems. In some embodiments, computer, display, and/or input device, may each be separate computer systems, applications, or processes or may run as part of the same computer systems, applications, or processes—or one of more may be combined to run as part of one application or process—and/or each or one or more may be part of or run on a computer system. A computer system may include a bus or other communication mechanism for communicating information, and a processor coupled with the bus for processing information. The computer systems may have a main memory, such as a random access memory or other dynamic storage device, coupled to the bus. The main memory may be used to store instructions and temporary variables. The computer systems may also include a read-only memory or other static storage device coupled to the bus for storing static information and instructions. The computer systems may also be coupled to a display, such as a CRT or LCD monitor. Input devices may also be coupled to the computer system. These input devices may include a mouse, a trackball, or cursor direction keys.

Each computer system may be implemented using one or more physical computers or computer systems or portions thereof. The instructions executed by the computer system may also be read in from a computer-readable medium. The computer-readable medium may be a CD, DVD, optical or magnetic disk, laserdisc, carrier wave, or any other medium that is readable by the computer system. In some embodiments, hardwired circuitry may be used in place of or in combination with software instructions executed by the processor. Communication among modules, systems, devices, and elements may be over a direct or a switched connection, and wired or wireless networks or connections, via directly connected wires, or any other appropriate communication mechanism. The communication among modules, systems, devices, and elements may include handshaking, notifications, coordination, encapsulation, encryption, headers, such as routing or error detecting headers, or any other appropriate communication protocol or attribute. Communication may also be messages related to HTTP, HTTPS, FTP, TCP, IP, ebMS OASIS/ebXML, secure sockets, VPN, encrypted or unencrypted pipes, MIME, SMTP, MIME Multipart/Related Content-type, SQL, etc.

Any appropriate 3D graphics processing may be used for displaying or rendering including processing based on OpenGL, Direct3D, Java 3D, etc. Whole, partial, or modified 3D graphics packages may also be used, such packages including 3DS Max, SolidWorks, Maya, Form Z, Cybermotion 3D, or any others. In some embodiments, various parts of the needed rendering may occur on traditional or specialized graphics hardware. The rendering may also occur on the general CPU, on programmable hardware, on a separate processor, be distributed over multiple processors, over multiple dedicated graphics cards, or using any other appropriate combination of hardware or technique.

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and fully automated via, software code modules executed by one or more general purpose computers or processors, such as those computer systems described above. The code modules may be stored in any type of computer-readable medium or other computer storage device. Some or all of the methods may alternatively be embodied in specialized computer hardware.

It should be emphasized that many variations and modifications may be made to the above-described embodiments, the elements of which are to be understood as being among other acceptable examples. All such modifications and variations are intended to be included herein within the scope of this disclosure and protected by the following claims.

The present invention has been described above with reference to specific embodiments. However, other embodiments than the above described are equally possible within the scope of the invention. Different method steps than those described above may be provided within the scope of the invention. The different features and steps of the invention may be combined in other combinations than those described. The scope of the invention is only limited by the appended patent claims.

The invention claimed is:

1. A method for associating a pre-operative plan with position and orientation of a surgical instrument in a surgical navigation system, comprising:

providing a pre-operative plan including patient anatomy data, wherein said pre-operative plan includes one or more of: a planned position and orientation of an implant relative the patient anatomy data, a planned position and orientation of a surgical instrument relative the patient anatomy data and trajectories of the surgical instrument for a planned outcome;

accessing said pre-operative plan within the surgical navigation system;

obtaining position and orientation of a patient anatomy within the surgical navigation system;

referencing, within the surgical navigation system, the patient anatomy to a virtual representation of the patient anatomy data in the accessed pre-operative plan;

obtaining intra-operative tracking data containing information of position and orientation of a surgical instrument within the surgical navigation system;

generating in a user interface of the surgical navigation system multiple virtual representations of the surgical instrument relative to multiple virtual representations of the pre-operative plan depending on the tracking data during a surgical procedure according to the accessed pre-operative plan;

generating at least one 3D representation as the virtual representation of the accessed pre-operative plan in a first part of the user interface, and generating at least one 2D representation as the virtual representation of the accessed pre-operative plan in a second part of the user interface, wherein each of the 3D representation and the 2D representation is generated dependent on the tracking data; and continuously generating grey value data and at least one of volumetric data and object data based on the patient anatomy data of the accessed pre-operative plan in at least one of parts of the user interface depending on said tracking data; and generating at least one object representation of the patient anatomy data, wherein the object representation and the grey value data and volumetric data are at least partially offset in an axial direction relative to the patient anatomy;

wherein at least one display plane for generating the virtual representation of the patient anatomy data is fixed relative to at least one dimension of the virtual representation of the surgical instrument, and said generating comprises continuously updating at least one of said virtual representations of the accessed pre-operative plan depending on said tracking data.

2. The method according to claim 1, wherein a plurality of orthogonally arranged display planes are fixed relative at least one dimension of the virtual representation of the surgical instrument or the pre-operative plan, and said generating comprises generating said multiple virtual representations of the surgical instrument relative said plurality of orthogonally arranged display planes and continuously updating the virtual representations of the pre-operative plan in at least one said part of said user interface depending on said tracking data.

3. The method according to claim 1, comprising obtaining the position and orientation of said at least one display plane based on at least one of a planned position and a planned orientation of an implant component relative said patient anatomy data of said pre-operative plan.

4. The method according to claim 1, wherein the user interface comprises at least first and second separate parts of a split window.

5. The method according to claim 4, comprising generating the virtual representations of the surgical instrument relative the virtual representations of the pre-operative plan in at least three orientations in three different parts of the split window simultaneously and depending on the tracking data.

6. The method according to claim 4, comprising obtaining orientation settings for at least one part of the split window from the pre-operative plan, wherein the orientation setting defines the orientation of at least one virtual representation of the pre-operative plan in at least one part of the split window.

7. The method according to claim 4, wherein an axial representation of the pre-operative plan is generated in a first part of the split window and at least one of a coronal representation and a sagittal representation of the pre-operative plan is generated in at least a second part of the split window and depending on the tracking data.

8. The method according to claim 1, comprising receiving identity data from at least one tracker of the navigation system, said tracker identity data being unique for each tracker in the navigation system;
   receiving position and orientation data of a tracker interface being attached to a tracker interface of an attachment component;
   obtaining calibration data defining the position and orientation of a portion of the surgical instrument relative a tracker interface of the attachment component; and
   translating the position and orientation data of the tracker interface into position and orientation data of the instrument using said identity data and said calibration data before generating the virtual representations of the surgical instrument relative the virtual representation of pre-operative plan.

9. A computer program product configured to execute the method of claim 1, wherein the computer program product is stored on a computer usable medium, and comprises computer readable program means for causing a computer to carry out said method when executed.

10. A system for associating a pre-operative plan with position and orientation of a surgical instrument in a surgical navigation system, comprising:
   a navigation system comprising at least one tracker attachable to an instrument to be tracked, and a localizer for tracking at least one of position and orientation of said at least one tracker; wherein:
      the at least one tracker comprises a position transmitter and a tracker interface for attaching the at least one tracker to said instrument;
      the navigation system is arranged to report tracking data comprising position and orientation of the tracker to the surgical navigation module; and
   a surgical navigation module configured to generate a pre-operative plan with a virtual representation of patient anatomy data; said pre-operative plan includes one or more of: a planned position and orientation of an implant relative the patient anatomy data, a planned position and orientation of a surgical instrument relative the patient anatomy data, a planned positioned and orientation of a surgical instrument relative the patient anatomy data and trajectories of the surgical instrument for a planned outcome;
   wherein the surgical navigation module is configured to:
      (i) generate tracked position and orientation of the surgical instrument during a surgical procedure following the pre-operative plan as virtual representations of the surgical instrument relative to virtual representations of the pre-operative plan in a user interface depending on said tracking data;
      (ii) generate at least one 3D representation as the virtual representation of the preoperative plan in a first part of the user interface, and generate at least one 2D representation as the virtual representation of the pre-operative plan in a second part of the user interface, wherein each of the 3D representation and the 2D representation is generated dependent on the tracking data;
      (iii) continuously generate grey value data and at least one of volumetric data and object data based on the patient anatomy data of the pre-operative plan in at least one of said parts of the user interface depending on said tracking data; and
      (iv) generate at least one object representation of the patient anatomy data, wherein the object representation, the grey value data and volumetric data are at least partially offset in an axial direction relative to the patient anatomy.

11. The system according to claim 10, wherein the surgical navigation module is further configured to fix at least one display plane for generating the virtual representation of the patient anatomy data relative to at least one dimension of the virtual representation of the surgical instrument, and to continuously update at least one of said virtual representations of the pre-operative plan depending on said tracking data.

12. A method for associating a pre-operative plan with position and orientation of a surgical instrument in a surgical navigation system, comprising:
   providing a pre-operative plan including a virtual representation of the patient anatomy based on patient anatomy data, a planned position and orientation of an implant relative the patient anatomy data, a planned position and orientation of a surgical instrument relative the patient anatomy data, and trajectories of the surgical instrument for a planned outcome;
   importing the pre-operative plan into the surgical navigation system;
   obtaining position and orientation of a patient anatomy within the surgical navigation system;
   referencing the position and orientation of the patient anatomy to the virtual representation of the patient anatomy data in the imported pre-operative plan within the surgical navigation system;
   obtaining tracking data containing information of position and orientation of the surgical instrument within the surgical navigation system during a surgical procedure following the planned position and orientation of the surgical instrument in the imported pre-operative plan; and generating in separate parts of a split window of a user interface of the surgical navigation system multiple virtual representations of the surgical instrument relative to multiple virtual representations of the imported pre-operative plan including said trajectories of the surgical instrument depending on the tracking data obtained during the surgical procedure following the imported pre-operative plan-continuously generating grey value data and at least one of volumetric data and object data based on the patient anatomy data of the accessed pre-operative plan in at least one of parts of the user interface depending on said tracking data; and generating at least one object representation of the patient anatomy data, wherein the object representation and the grey value data and volumetric data are at least partially offset in an axial direction relative to the patient anatomy.

13. The method according to claim 12, wherein at least one display plane for generating the virtual representation of the patient anatomy data is fixed relative at least one dimension of the virtual representation of the surgical instrument, and said generating comprises continuously updating at least one of said virtual representations of the pre-operative plan depending on said tracking data.

14. The method according to claim 12, wherein a plurality of orthogonally arranged display planes are fixed relative at least one dimension of the virtual representation of the surgical instrument or the imported pre-operative plan, and said generating comprises generating said multiple virtual representations of the surgical instrument relative said plurality of orthogonally arranged display planes and continuously updating the virtual representations of the pre-operative plan in at least one part of said split window depending on said tracking data.

15. The method according to claim 13, further comprising obtaining the position and orientation of said at least one display plane based on at least one of a planned position and a planned orientation of an implant component relative said patient anatomy data contained in the imported pre-operative plan.

16. The method according to claim 12, further comprising generating at least one 3D representation as the virtual representation of the pre-operative plan in a first part of the split window, and generating at least one 2D representation as the virtual representation of the imported pre-operative plan in a second part of the split window, wherein each of the 3D representation and the 2D representation is generated dependent on the tracking data.

17. The method according to claim 16, comprising generating grey value data from the patient anatomy data of the pre-operative plan in at least one of said separate parts of said split window depending on said tracking data.

18. The method according to claim 17, comprising continuously generating at least two of grey value data, volumetric data, and object data based on the patient anatomy data of the pre-operative plan and in at least one of said separate parts of said split window depending on said tracking data.

19. A computer program product configured to execute the method of claim 12, wherein the computer program product is stored on a computer usable medium, and comprises-comprising computer executable instructions configured to cause a computer to carry out said method when executed.

20. The method according to claim 1, wherein said accessing the pre-operative plan within the surgical navigation system comprises importing the pre-operative plan into the surgical navigation system.

21. The method according to claim 20 wherein, said importing comprises importing the pre-operative plan into a CAD module of the surgical navigation system.

22. The method according to claim 1, wherein the pre-operative plan includes at least the planned position and orientation of an implant relative the patient anatomy data, and the planned position and orientation of a surgical instrument relative the patient anatomy data.

23. The method according to claim 22, wherein the pre-operative plan further includes the trajectories of the surgical instrument for the planned outcome.

24. The system according to claim 10, wherein the pre-operative plan includes at least the planned position and orientation of an implant relative the patient anatomy data, and the planned position and orientation of a surgical instrument relative the patient anatomy data.

25. The system according to claim 24, wherein the pre-operative plan further includes the trajectories of the surgical instrument for the planned outcome.

* * * * *